US012754084B2

(12) United States Patent
Kennedy, III et al.

(10) Patent No.: US 12,754,084 B2
(45) Date of Patent: Oct. 6, 2026

(54) OPTICAL TACTILE SENSOR

(71) Applicant: The Board of Trustees of the Leland Stanford Junior University, Stanford, CA (US)

(72) Inventors: Monroe Kennedy, III, Palo Alto, CA (US); Won Kyung Do, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 306 days.

(21) Appl. No.: 18/714,268

(22) PCT Filed: Nov. 22, 2022

(86) PCT No.: PCT/US2022/050651

§ 371 (c)(1),
(2) Date: May 29, 2024

(87) PCT Pub. No.: WO2023/101859

PCT Pub. Date: Jun. 8, 2023

(65) Prior Publication Data

US 2025/0020523 A1 Jan. 16, 2025

Related U.S. Application Data

(60) Provisional application No. 63/284,579, filed on Nov. 30, 2021.

(51) Int. Cl.
*G01L 1/24* (2006.01)
*G01L 1/22* (2006.01)
(Continued)

(52) U.S. Cl.
CPC ................ *G01L 1/24* (2013.01); *G01L 5/166* (2013.01); *G01L 5/226* (2013.01); *B25J 13/084* (2013.01)

(58) Field of Classification Search
CPC .. G01L 1/24; G01L 5/166; G01L 5/226; B25J 13/082; B25J 13/084; B25J 13/085
See application file for complete search history.

(56) References Cited

U.S. PATENT DOCUMENTS 7,707,001 B2 * 4/2010 Obinata ................ G01N 19/02 702/41
2021/0318116 A1 * 10/2021 Adelson .............. B25J 15/0009
(Continued)

OTHER PUBLICATIONS

Sferrazza, Carmelo, and Raffaello D'Andrea. "Transfer learning for vision-based tactile sensing." 2019 IEEE/RSJ International Conference on Intelligent Robots and Systems (IROS). IEEE, 2019.*
(Continued)

*Primary Examiner* — Herbert K Roberts
(74) *Attorney, Agent, or Firm* — LUMEN PATENT FIRM

(57) ABSTRACT

An optical tactile sensing method is provided distinguishing having an optical tactile sensor and performing shape reconstruction and force measurement. The optical tactile sensor has an elastomeric hemisphere. A single camera captures the illumination of the entire reflective inner surface of the elastomeric hemisphere in a single input image. Shape reconstruction for a novel shape is performed while in contact with the hemisphere. Image pixels of a single sensor input image are inputted to a trained neural network, which outputs shape characteristics of the contact of the novel shape. With a continuous pattern on the elastomeric hemisphere, the optical tactile sensing method further distinguishes performing force reconstruction/estimation. Force reconstruction/estimation is performed through tracking deformation of the continuous pattern of the elastomeric hemisphere. Multiple sensor input images collected during the deformation are inputted to a trained neural network, which outputs force vector information of the contact of the novel shape.

9 Claims, 21 Drawing Sheets

$(R_{ray}, \theta, \psi) = f_{Raycast}(x_{stl}, y_{stl}, z_{stl})$

(51) Int. Cl.

| | |
|---|---|
| ***G01L 5/166*** | (2020.01) |
| ***G01L 5/22*** | (2006.01) |
| *B25J 13/08* | (2006.01) |

(56) References Cited

U.S. PATENT DOCUMENTS

| | | | | |
|---|---|---|---|---|
| 2021/0334584 | A1* | 10/2021 | Zheng | B25J 13/084 |
| 2024/0153115 | A1* | 5/2024 | Wang | G01B 11/24 |

OTHER PUBLICATIONS

Gomes, Daniel Fernandes, Zhonglin Lin, and Shan Luo. "GelTip: A finger-shaped optical tactile sensor for robotic manipulation." 2020 IEEE/RSJ international conference on intelligent robots and systems (IROS). IEEE, 2020.*

Sun, Huanbo, Katherine J. Kuchenbecker, and Georg Martius. "A soft thumb-sized vision-based sensor with accurate all-round force perception." Nature Machine Intelligence 4.2 (2022): 135-145.*

OmniTact: A Multi-Directional High-Resolution Touch Sensor, May 14, 2020 https://arxiv.org/abs/2003.06965.

Fernandez—Visiflex: A Low-Cost Compliant Tactile Fingertip for Force, Torque, and Contact Sensing. IEEE Robotics and Automation Letters. Preprint Version. Accepted Feb. 2021.

* cited by examiner

Curved membrane limit surface

OPTICAL TACTILE SENSOR

FIELD OF THE INVENTION

This invention relates to optical tactile sensors.

BACKGROUND OF THE INVENTION

Robots capable of manipulation have been adopted in a variety of industrial applications including car manufacturing, welding, and assembly line manipulation. Despite the surge of robotics in automation, it is still challenging for robots to accomplish general, dexterous manipulation tasks. For example, factory workers in smartphone companies are still assembling motherboards and electronic parts by hand. Furthermore, with an increasing number of worldwide aging populations, personal assistive robots can help solve the several problems facing aging society, reducing the load of human caretakers. One of the major requirements of personal assistant robots is the ability to manipulate small objects, as well as adapt to a possibly changing manipulation environment.

Modern robots capable of performing manipulation still find it difficult to perform in-hand manipulation or accurately measure the deformation of soft fingertips during complex dexterous manipulation. This problem has been managed from many different approaches including the design of new hardware, developing perception and recognition functionality for the robots, or solving control and motion planning tasks of the robotic assistant. However, persistent challenges for manipulation in general tasks are the lack of tactile feedback with sufficiently high resolution, accuracy, and dexterity that rivals anthropomorphic performance.

Vision-based, soft tactile sensors capable of reconstructing surface deformation and applied forces with high accuracy can address some of the problems stated above. To better model the object(s) within the manipulation task, precise geometric and contact information of the object and environment must be ensured.

Therefore, high-resolution tactile sensing that provides rich contact information is an essential step towards high precision perception and control in dexterous manipulation.

Common major challenges with the vision-based tactile sensor are accurate pose estimation from sensory input, limited two-dimensional (2D)-shape of the sensor, and high construction costs. Some existing tactile sensors are capable of detecting the surface deformation from the soft elastomer, but the 2D shape limits in-hand manipulation. Some three-dimensional (3D)-shaped sensors are capable of estimating the angle of contact based on the tactile sensor image, however, currently such sensors are very expensive for scaling to multi-finger manipulation tasks.

This present invention is aimed at advancing the art in providing an optical tactile sensor that has a 3D shape, is relatively inexpensive, and is capable of solving state estimation tasks more accurately.

SUMMARY OF THE INVENTION

The present invention provides an optical tactile sensing method distinguishing in one embodiment the steps of having an optical tactile sensor and performing shape reconstruction and force measurement. The optical tactile sensor has an elastomeric hemisphere with an outer contact surface, a reflective inner surface, and a base. The optical tactile sensor further has an array of LEDs circumferentially spaced at the base and capable of illuminating the reflective inner surface, and a single camera positioned at the base. The single camera is capable of capturing the illumination of the entire reflective inner surface of the elastomeric hemisphere in a single input image. A suitable single camera, for example, is a Fisheye lens camera.

Shape reconstruction for a novel shape is performed while the novel shape is in contact with the outer contact surface of the elastomeric hemisphere. Shape reconstruction is based on inputting image pixels of a single sensor input image obtained from the novel shape while in contact with the outer contact surface, to a trained neural network. The trained neural network is outputting shape characteristics of the contact of the novel shape.

The training of the trained neural network is based on mapping known three-dimensional (3D) shapes, each in contact with and covering the entire outer contact surface at once, with corresponding image pixels of resulting single input images obtained from captured LED illumination of the reflective inner surface by the single camera while the known 3D shapes were in contact with and covering the entire outer contact surface. The known 3D shapes represent different shape deformations of the outer contact surface, and could have one or more indenters or one or more shape indicators.

In a further embodiment of the optical tactile sensor the elastomeric hemisphere further has a continuous pattern. Then continuous pattern is defined as a long line that connects evenly spaced points over the surface of the sensor in a manner that the line never crosses itself, and in a small region on the surface line segments between connected points span the local plane such that stretching of the surface in any direction results in measurable changes in the surface pattern (some of the lines shift position under surface deformation as opposed to simply changing length). Key attributes of the pattern are that 1) the line that connects the evenly spaced points does not cross itself and there are no breaks in the line, and 2) for a small local area on the sensor's surface, portions of the line (segments) point in every direction on the surface making deformation easy to detect with a camera observing the pattern deformation. The continuous pattern can also be defined as a pattern uniformly distributed on the surface of the elastomeric hemisphere that has a connected, curved line whose tangents span the plane with sufficient redundancy, allowing for unique representation of large surface deformations of the stretching or twisting variety. For the continuous pattern, the requirements of the pattern are that it be uniform over the surface of the sensor, and within a small segment of the image the segment subregion must contain connected (continuous) lines, that do not cross each other, and whose tangent lines span the planar space with sufficient redundancy. The continuous pattern allows for unique recognition under extreme deformation of all varieties (stretching or twisting). Differently stated, the curve must be highly curved so that no matter how you deflect the surface, it can be tracked and it's so unique that one would be able to determine how it was deflected. A sine curve is a good example of this. If one would draw tangent lines along a sine curve they would point in every direction in the plane (redundantly), so any deflection of the surface would be motion in one of the directions of the tangent line and perpendicular to another tangent, meaning no matter how you deflected the sensor you would see unique change in the pattern of the surface.

When the term connected is discussed or mentioned the inventors mean this opposite to discrete. It does not mean that the lines are connected perse with their respective ends. Simply said it mean that one drawing the curve is not lifting the pen as they draw.

With the continuous pattern, the optical tactile sensing method further distinguishes the step of performing force reconstruction/estimation. For reconstruction or estimation is performed through tracking deformation of the continuous pattern of the elastomeric hemisphere while the novel shape is in contact with the outer contact surface. The tracking is obtaining multiple sensor input images collected during the deformation of the continuous pattern and inputting the image pixels of the multiple sensor input images to a trained neural network. The trained neural network is outputting force vector information of the contact of the novel shape. The force vector field is defined as a 4D force vector with forces in X, Y, Z direction and torsion.

The training of the trained neural network is based on a mapping of known applied force vector fields each in contact with the outer contact surface and causing known deformations of the continuous pattern of the elastomeric hemisphere, with corresponding image pixels of resulting multiple input images obtained from captured LED illumination of the reflective inner surface by the single camera while the known applied force vector fields and therewith known deformations were applied to the outer contact surface.

The examples provided herein discuss an optical tactile sensor with an elastomeric hemisphere which is a 3D shape. Variations to the shape of the elastomeric hemisphere can be in any form of a 3D shape including a skin-type suitable for robotic skin applications as well as a two-dimensional (2D) (flat) shapes, as the methods of shape and force reconstruction as provided herein would still apply for these shapes.

Embodiments of the invention also pertain to the optical tactile sensor as a device where the methods of shape and force reconstruction can be integrated with the sensor as hardware encoded software algorithms.

Embodiments of the inventions are suitable for applications where shape and force reconstruction or estimation is needed in for example automation for manufacturing/assembly robots. To assemble small, delicate objects like smartphones, embodiments of the invention enable robots to manipulate objects on this scale with performance comparable to humans. This also extends to the manufacturing of objects on the macro-scale where forces at the fingertips is required for high-performance and safety.

Embodiments of the inventions are also suitable for applications in collaborative robotics. For example, humanoid robots designed to perform assistive tasks with and for human counterparts, the development of humanoid platforms to be truly functional, these platforms must be able to manipulate objects comparable to humans and adapt quickly to new tasks. Embodiments of the invention are the key catalyst to the usefulness of these platforms.

This application claims the benefit of U.S. Application 63/284,579 filed Nov. 30, 2021, which is incorporated herein by reference.

BRIEF DESCRIPTION OF THE DRAWINGS

In FIG. 8A the importance of markers for observing pure shear is demonstrated. In FIG. 8C patterned markers are more informative for rotations than points. In FIG. 8C, space management and aliasing can be accommodated by markers with continuous path-patterns with sucient resolution.

FIG. 10B shows the resulting continuous limit surface for the illustrated membrane-object configuration. The normal forces $F_N$ are capable of applying both $\pm F_x$, $\pm F_y$, but no moment as they pass through the origin, resulting in the red path traced out from A $(+F_x)$:B$(F_y)$:C$(F_x)$. Shear forces $F_s$ are capable of applying $\pm F_x$, $\pm F_y$, $\pm M_z$, resulting in the green cylindrical limit surface. The combination of limit surfaces from $F_N$ and $F_s$ results an xy-plane oval profile with a single axis of symmetry.

The gel mount reflects the light from LED while the gel is covered with the pattern and reflective surface.

Figure 13:
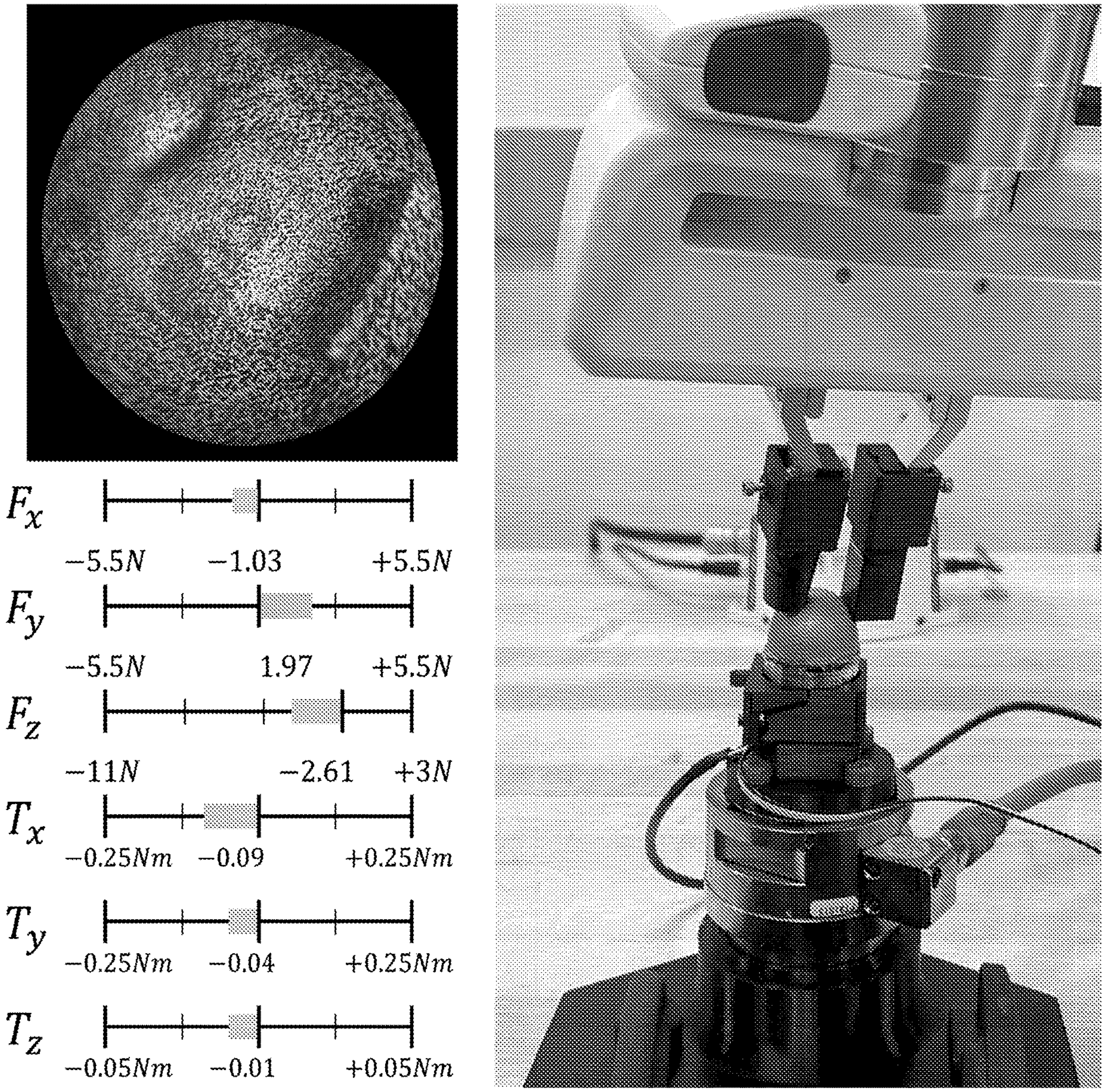

FIG. 13 shows according to an exemplary embodiment of the invention force data collection. The optical tactile sensor has been pushed under an ATI Gamma sensor with the Panda arm, where the grippers are covered with indenters.

Figure 14:
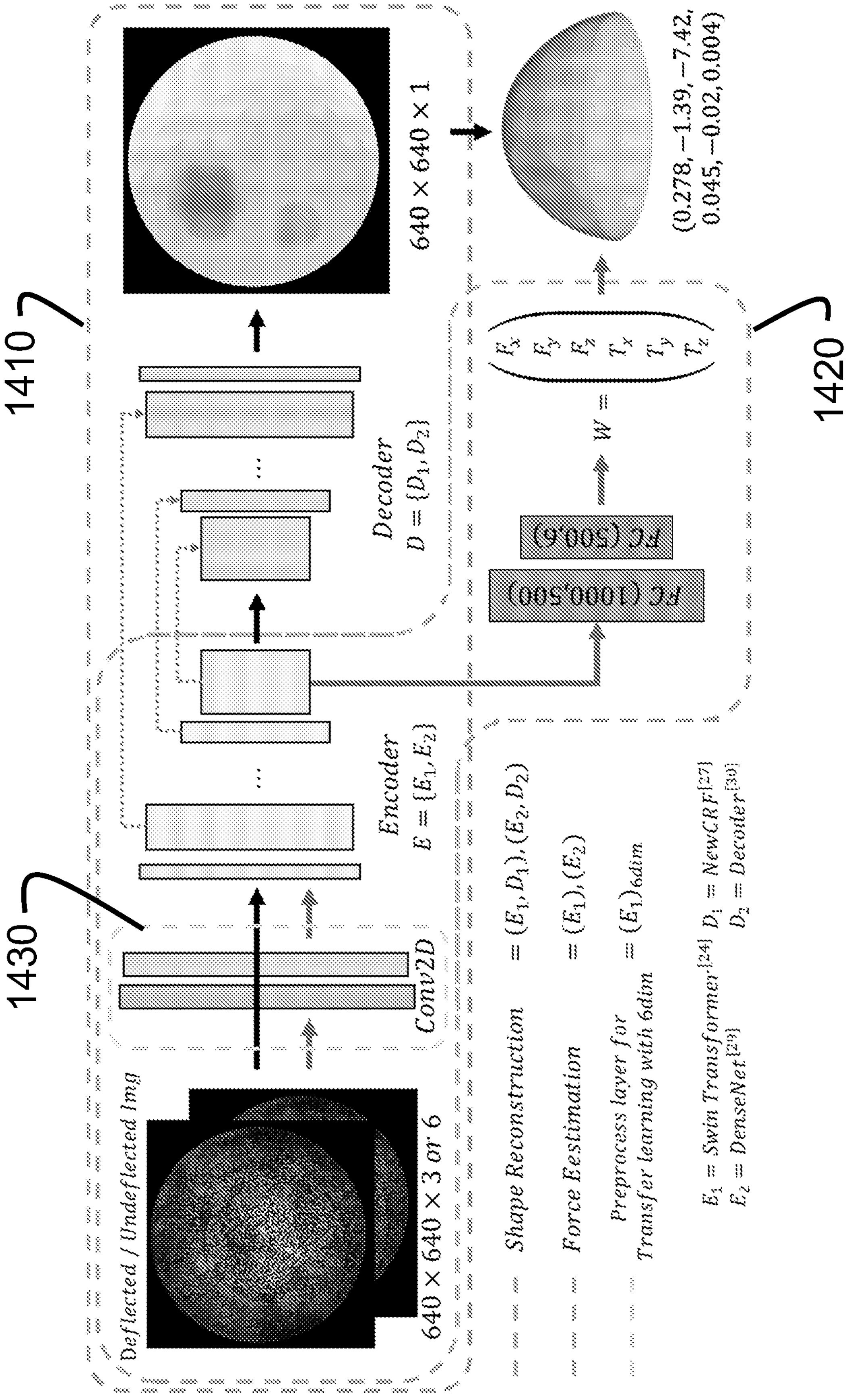

FIG. 14 shows according to an exemplary embodiment of the invention an algorithm for shape and force reconstruction/estimation. The sensor interior is the input to the encoder-decoder network for shape estimation model (box 1410). Force estimation models (box 1420) has an encoder with fully-connected layers. Transfer learning model with 6 dimension (includes box 1430) takes deflected and undeflected image as an input.

Figure 15:
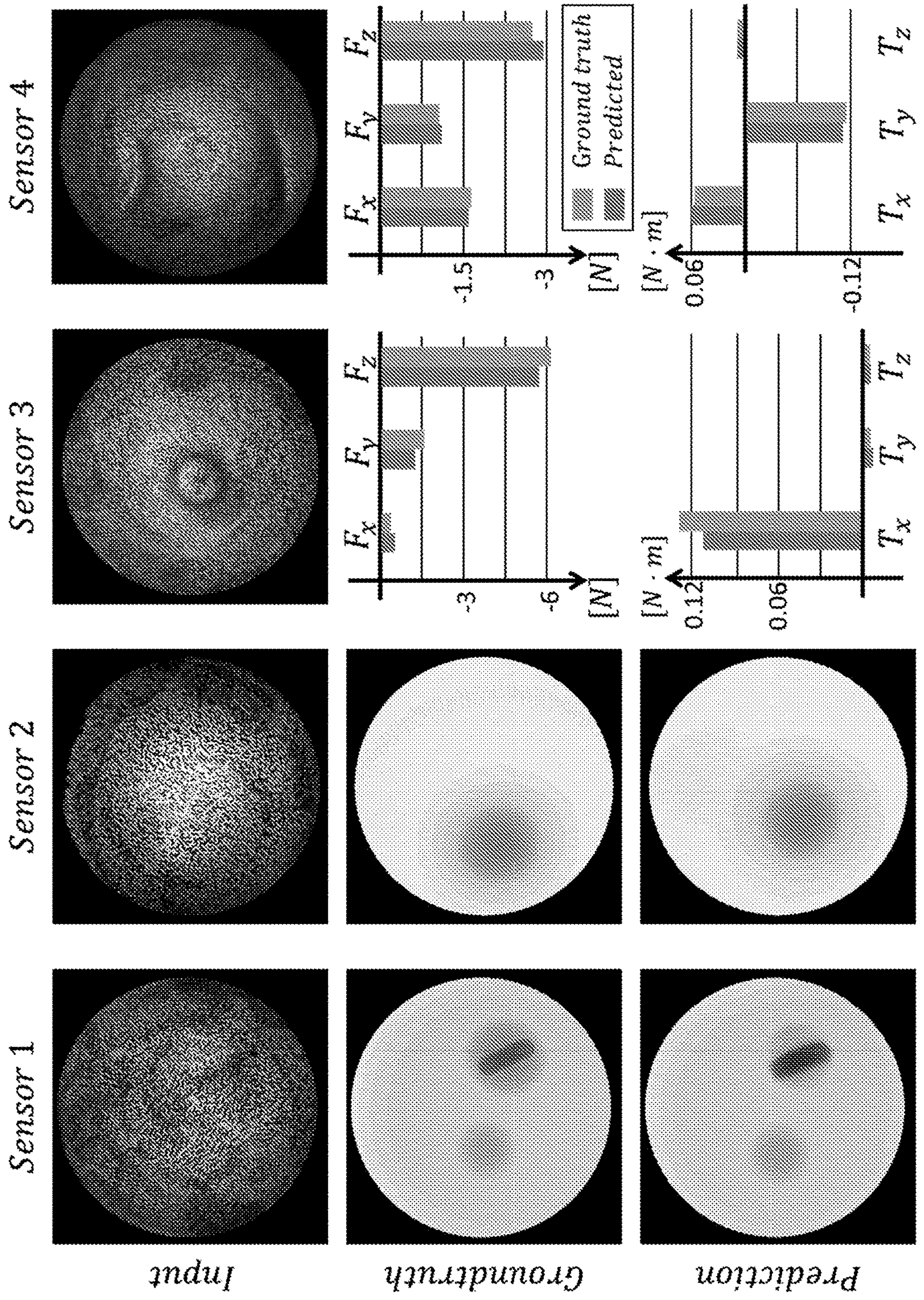

FIG. 15 shows according to an exemplary embodiment of the invention shape and force reconstruction performance. Examples from test set for sensor shape and force reconstruction. Ground truth is the right bar in pair of bars, and predicted is the left bar in the pair of bars.

DETAILED DESCRIPTION

Figure 1:
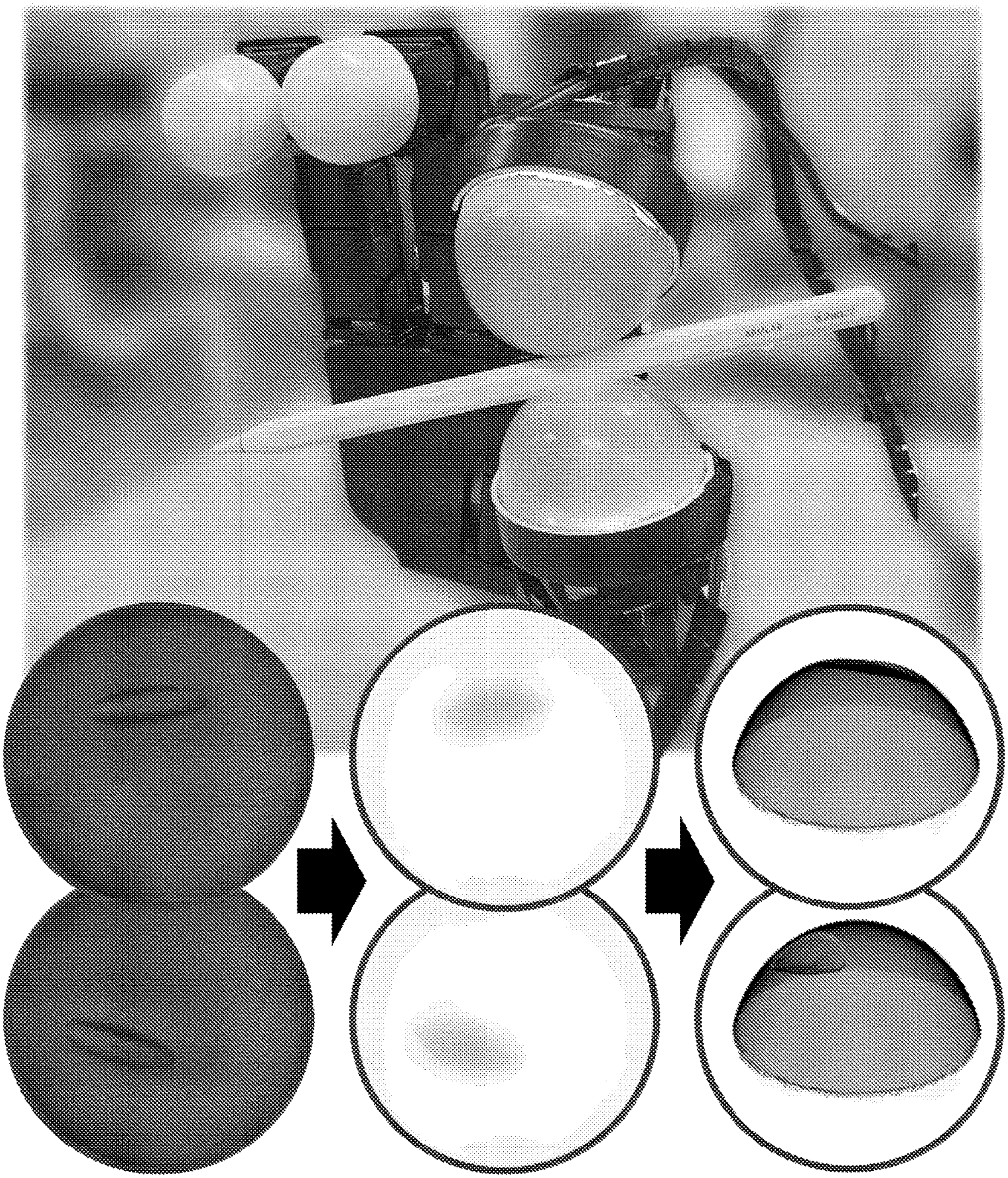
FIG. 1 shows according to an exemplary embodiment of the invention the optical tactile sensor outfitted on the Allegro hand. Left bottom image shows the image taken from the cameras. Middle bottom shows the resultant depth image. Right bottom represents the 3D reconstructed surface of current sensor. The optical tactile sensor is composed of a silicone elastomer coated with a reflective surface and attached on a 3d-printed-mount with a fisheye lens camera and LED strip.

The sensor provided with this invention is a vision-based, soft tactile sensor designed for accurate position sensing. In one embodiment, the sensor design has a hemispherical shape with a fisheye lens camera with a soft elastomer contact surface (FIG. 1). The interior of the sensor is illuminated allowing for tactile feedback with a single image. From the high-resolution image, the corresponding 3D surface of the sensor is estimated. The description details the optical tactile sensor design, and methods for performing shape and force reconstruction or estimation with such an optical tactile sensor.

Optical Tactile Sensor

Criteria

For a general manipulation task, a tactile sensor is needed that maximizes the quality of information at the contact surface. To meet this criterion, the design goals for the sensor are: 1) Small sensor size, useful for in-hand, small-object manipulation. 2) 3D curved shape with a very soft surface, enabling versatile manipulation. 3) High-resolution surface deformation modeling (shape reconstruction) for contact sensing. In one embodiment, a fisheye-lens camera combined with hemispherical shaped, transparent elastomer design satisfies the above criteria. When the contact (i.e. interior surface) boundary of the elastomer has a reflective coating, the monocular camera can observe the interior deformation of the elastomer from a single image provided there is sufficient interior illumination.

Elastomer Fabrication

Primary design goals for the vision-based sensor are that it be cost-efficient, high-resolution, and have a 3D shape which is captured by a hemispherical design useful for soft-finger manipulation. To provide the elastic, restorative function after sensor contact, previous work has leveraged elastomer-based and air-pressure based approaches for shape restoration. However, limitations of air-pressure methods are that large sensor sizes are often necessary for pneumatic transmission. This motivates the design selection of a hemispherical shaped, transparent elastomer with a reflective surface boundary to allow an interior monocular camera to observe the sensor deformation. In an exemplary embodiment, the elastomer selected is the extra-soft silicone for the elastomer (Silicone Inc. P-565 Platinum Clear Silicone, 20:1 ratio). It has a 6.5 shore A hardness, which is similar to hardness of human skin. The extra soft elastomer maximizes the surface deformation even from a small shear force. A clear elastomer surface is ensured by using the marble to make a silicone mold of the elastomer. After the elastomer is cured, Inhibit X adhesive is applied before airbrushing the surface with the mixture of reflective metallic ink and silicone (Smooth-on Psycho Paint).

Camera and Illumination System

A cost-effective camera solution is selected that has a small size for in-hand manipulation while enabling real-time image processing. The image sensor is the Sony IMX179, which can capture 8 MP and perform image processes in real-time with a maximum of 30 fps. Instead of using multiple cameras to observe the whole hemispherical sensor surface, a circular fisheye lens with 185 degrees foV was used. By capturing the entire elastomer surface with a single camera, the computational load is significantly reduced compared to similar vision-based tactile sensors systems that require multiple cameras, while still maintaining comparable, high-resolution observation of the sensor contact surface. The interior of the soft-sensor is illuminated by an LED strip with flexible PCB. In an exemplary embodiment, the LED strip contains 24 RGB LEDs arranged into a cylindrical pattern at the base of the elastomer. While brightness is consistent for illuminated LEDs, each LED can be activated independently. The cylindrical arrangement of the LEDs permits the use of three LEDs spaced at 120° to be illuminated with different colors (red, green, blue). This illumination strategy allows for surface depressions to emit color patterns which indicate surface shape correlated to color channel reflectivity.

Sensor Assembly

Figure 2:
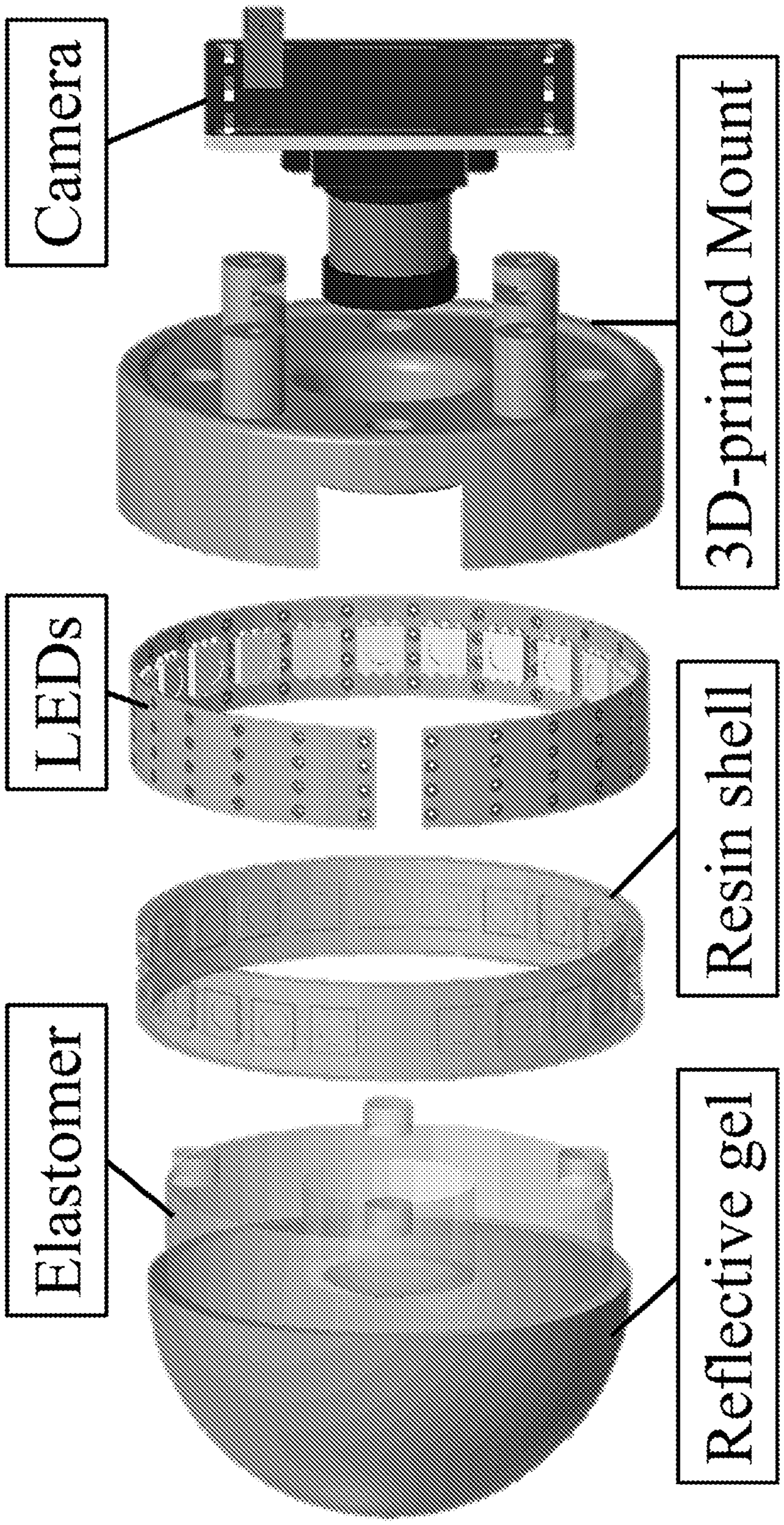
FIG. 2 shows according to an exemplary embodiment of the invention an exploded view of the optical tactile sensor.
Figure 4:
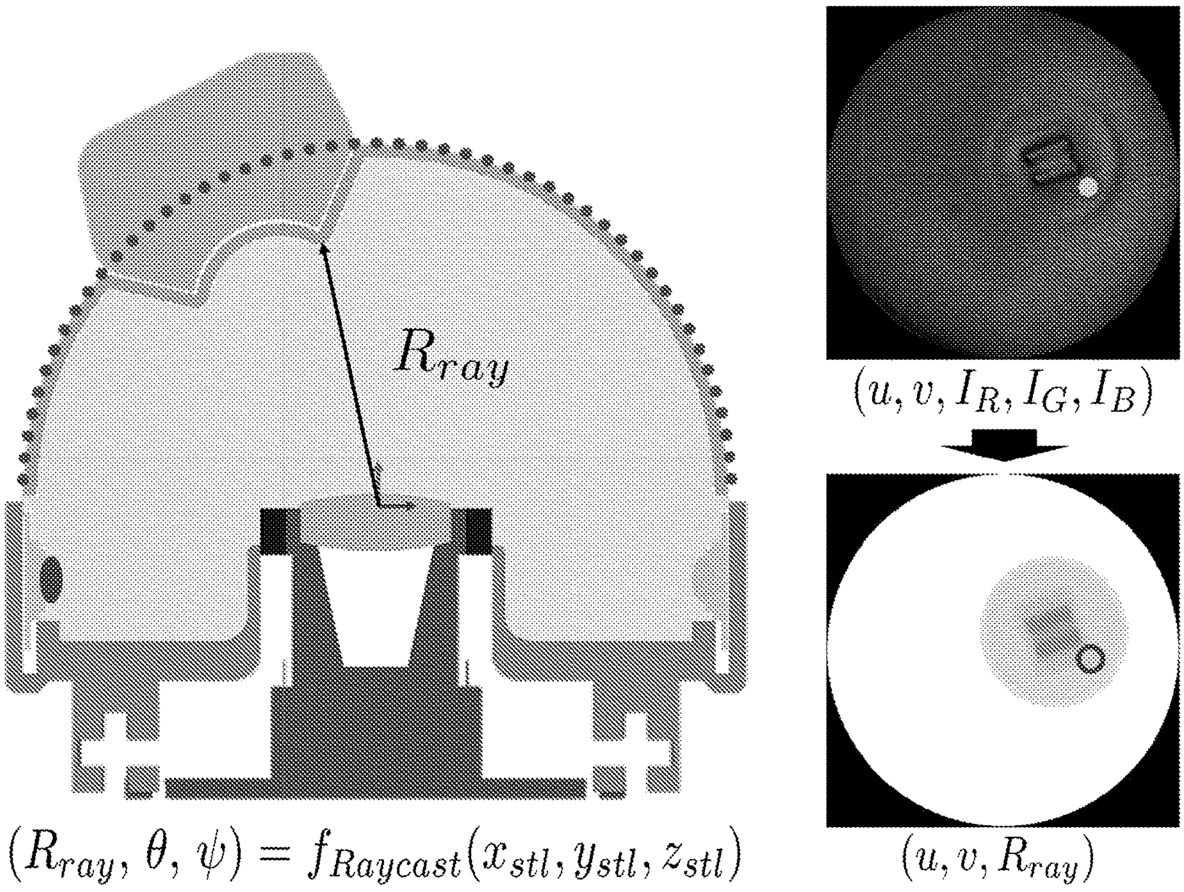
FIG. 4 shows according to an exemplary embodiment of the invention a Ray Casting Algorithm. Ray casting is used to determine the radial depth from the 3D calibration surface which is then projected into the image plane.

FIG. 2 and center image in FIG. 4 show the exploded and cross-sectional view of the exemplary sensor respectively. Once assembled, the center of the camera lens is aligned to coincide with the center of the hemispherical elastomer, and the strip LEDs are located right below the elastomer as shown in FIG. 2. In one example, the sensor has a height of 35 mm and the hemisphere elastomer has a radius of 25 mm. In this configuration, the sensor can sense almost 4,000 $mm^2$ of the elastomer surface. A 3D printed camera mount is used to fasten the camera and elastomer, and the LED strip is fitted around the interior of this camera mount. A problem of elastomer-based tactile sensors is their durability. To increase durability, resin can be used as an adhesive for the LEDs and the camera mount. Once the resin is cured, the cured elastomer is then attached to the mount using Sil-Poxy adhesive. This method of construction allows the elastomer to support higher forces without fatigue and degradation.

Experiments have shown that this sensor design can be reduced in size, with a hemispherical radius of 15 mm and 25 mm sensor height, enabling more delicate manipulation.

Shape Reconstruction

Recent approaches for shape reconstruction in vision-based sensors are based on sensor interior surface normal estimation. Assuming the sensor surface is Lambertian and the reflection and lighting are equally distributed over the sensor surface, the intensity on each color channel can be leveraged to estimate a unique surface normal. The intensity color difference between the deflected and non-deflected surface is then correlated to the surface gradient $\nabla f(u, v)$ by inverting the reflective function R. One of such sensors then calibrate the $R^{-1}$ by mapping RGB values to the surface normal through a lookup table. From the surface normal for each point, the height-map of the sensor can then be reconstructed by solving the Poisson equation with the appropriate boundary condition. However, such method is not applicable for 3D shape sensor with non-Lambertian surface. Then the reflective function R also depends on the location as well as surface normal:

$$I(u, v) = R\left(\frac{\partial f}{\partial u}(u, v), \frac{\partial f}{\partial v}(u, v), u, v\right), \quad (1)$$

where (u, v) is the position of the pixel or corresponding location on the sensor surface. The above function is non-linear and it is impossible to get the inverse. One way to obtain the inverse function is to leverage a data-driven approach. Given that the sensor environment is restricted and reproducible, if the sensor surface shape is known (ground truth) then to perform shape reconstruction the objective is to determine a nonlinear function M such that $$(R, \theta, \psi) = M(I_{rgb}(u, v)), \quad (2)$$

where (R, θ, ψ) is corresponding spherical coordinate of the sensor surface from the position in the image frame (u, v). One way to solve equation 2 is to determine a proper network structure for M.

Depth Data Generation

Figure 3:
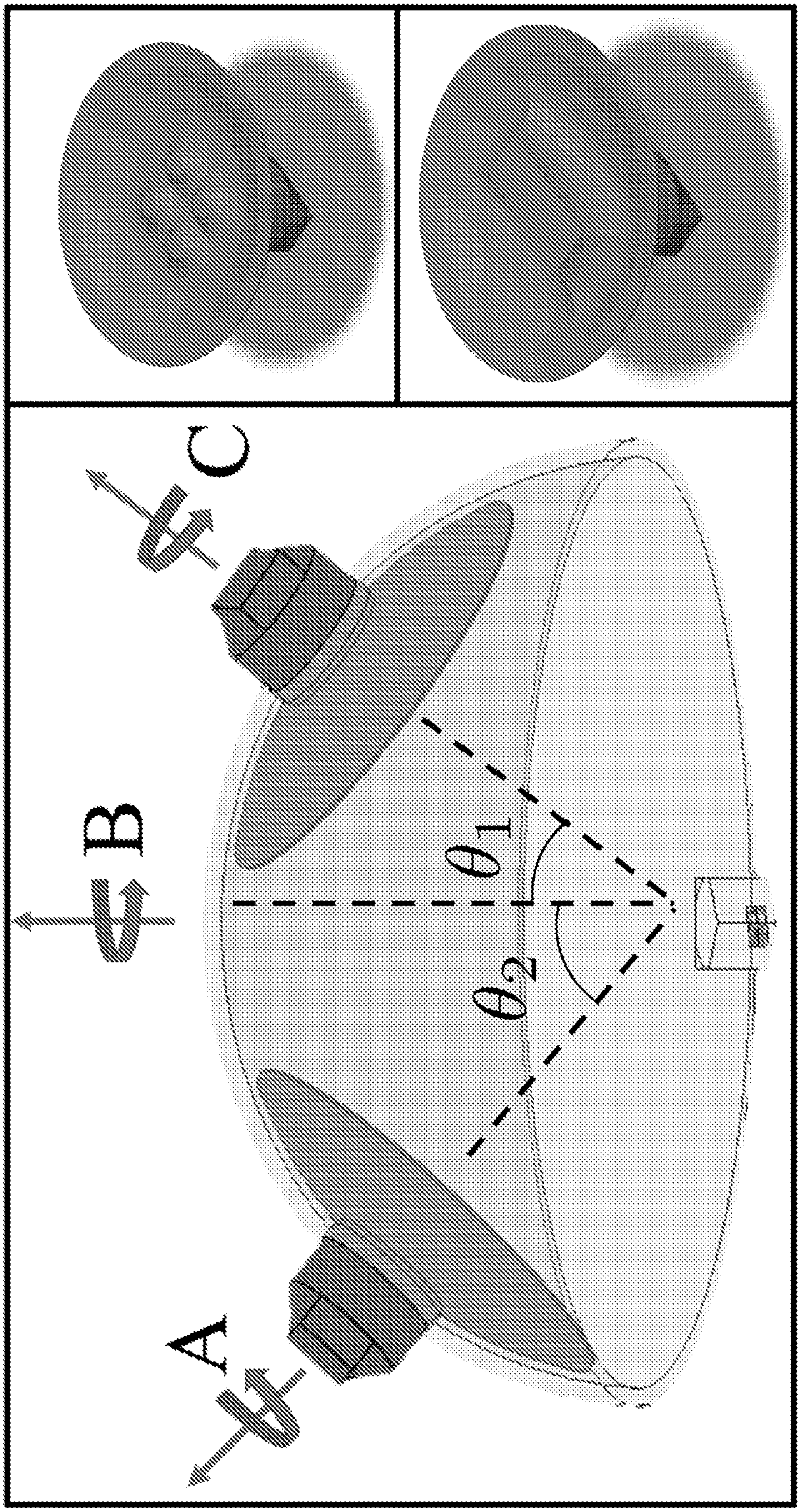
FIG. 3 shows according to an exemplary embodiment of the invention data collection. 3D printed parts are printed and pressed in varying configurations into the sensor for calibration.

The sensor must produce a high-resolution representation of the sensor surface from a single image. This requires accurate, high-resolution ground-truth surface knowledge for model training. The sensor surface is hard to externally detect using commercial range-finding, active sensors (projected light or time-of-flight sensors). Measurements from such range-finding sensors have errors at millimeter scale which would propagate to the ground-truth measurement. To avoid this problem, data is generated by 3D printing a known computer-generated surface model, and is subject to the accuracy of the 3D printer. The dataset generated in this manner has all the shape information required to estimate the surface shape at each corresponding image pixel necessary for model training. Given that partial contact would cause deformation of the soft-sensor in un-touched regions of the elastomer, the known 3D printed shapes pressed into the elastomer cover the entire sensor surface at once, limiting unwanted motion, such that every location on the surface is known for a given contact. Training shapes were printed on Ultimaker S5 3D printer and included an indicator (large shell shown in FIG. 3) as well as indenters (small components in FIG. 3). The Ultimaker S5 is capable of printing layers with a minimal size of 60 microns and positioning precision of 6.9 microns. The stated uncertainty of the fused deposition modeling (FDM) printer is 100 microns (0.1 mm), however this still presents a valid method of obtaining a shape ground-truth for the entire surface at once under depression. To diversify the generated dataset from a limited source of material, a hemispherical shape indicator is printed with a single or multiple holes and indenter that fits the hole. The right two images in FIG. 3 show examples of the indenter. A total of 40 different hemispherical indicators were printed with a different number of holes and locations. Indicators have different shapes variations that include with a single or two holes, or with a hole and in-built indenter. The left image in FIG. 3 shows the overall view of the printed indicator that has two holes assembled with two different indenters. Location of hole varies with different $\theta_1$ and $\theta_2$. A total of 20 different indenters with various shapes were also printed and examples are shown in the right two images of FIG. 3. The dataset is also varied by changing the angle in terms of axis A and axis C in FIG. 3.

For accurate position control of 3D printed objects, a CNC machine is utilized for data generation. The sensor is fixed on the bottom plate while the 3D printed object is mounted on the motorized part. The spindle motor is substituted with an object holder which is attached to the stepper motor. The attached stepper motor has 400 steps per one revolution, which gives an additional degree of freedom during data collection (rotation B in FIG. 3). After getting the radial value from the STL file with the ray casting algorithm, the depth value is normalized to an 8-bit integer (0-255) to reduce the size of the output value. Possible resolution loss is prevented by normalizing the value with the maximum deformation value. By doing so, 1-pixel intensity corresponds to the 0.0354 mm increment in actual depth value. Finally, a total of 30,200 different contact configurations are generated which has 29,200 training configurations and 1,000 test configurations. Note that a different combination of indicators and indenters are used for the test set comparing to the training set. The total dataset size is 3.6 GB.

3D Correspondence from Camera Image

The next step for shape reconstruction is finding correspondence between the image from the camera and sensor surface. The fisheye lens produces additional distortion on the image and bars the use of common calibration methods since the correspondence with the 3D-shaped sensor surface is needed. The calibration method for a wide fisheye lens and the omnidirectional camera has been proposed by Scaramuzza et al. (In a paper: A toolbox for easily calibrating omnidirectional cameras in 2006 IEEE/RSJ International Conference on Intelligent Robots and Systems. IEEE, 2006, pp. 5695-5701), however, the main purpose of the calibration is to get the undistorted panoramic image. Therefore, a new correspondence model for the sensor must be built.

First, a 3D-printed indicator with a known size is built. The indicator has 2 mm thickness and a saw-tooth shape with equal angular interval, 5 degrees. By pushing the indicator in a fixed position parallel with the x-axis of the image, the saw tooth is detected from the sensor image. The position of each saw-tooth from the image is detected by using the Canny edge method. From these detected edges from the image, the edge position is matched with the edge position on the sensor surface.

The distorted image from the camera has symmetric distortion in terms of y direction, and the center of the image is aligned with the center axis of the tactile sensor. The radius from the center of the image corresponds with the R sin(θ) in the hemispherical sensor surface. The Gaussian Process (GP) regression model is implemented for the correspondence between radius in image r and radius in the sensor surface R sin(θ). From this correspondence, these indexes are matched and each image pixel is transformed into the right θ, ψ in spherical coordinates.

$$R\sin(\theta) = f_{GP}(r(u, v)) \quad (3)$$

$$(\theta, \phi) = \left(\sin^{-1}\left(\frac{f_{GP}(r)}{R}\right), \tan^{-1}\left(\frac{v - v_c}{u - u_c}\right)\right) \quad (4)$$

where $u_c$, $v_c$ is center of the image plane. Once the conversion between (u, v) and (θ, φ) is done, the corresponding R from the STL file of a combined 3D indicator is found. Based on the vector generated from (θ, φ) for each pixel, the ray casting algorithm allows computing the closest point on the surface of triangular mesh from STL file (Zhou et al. Open3D: A modern library for 3D data processing," arXiv: 1801.09847, 2018). FIG. 4 shows the cross-section view of the sensor with a radius defined from the ray casting algorithm. Once the depth or the radius information for each corresponding pixel value is obtained, the pixel value is directly matched with the depth from the ray casting algorithm:

$$R_{ray}(u, v) = f_{raycast}(\mathrm{Mesh}_{stl}, \theta(u, v), \psi(u, v)), \tag{5}$$

which makes 1:1 correspondence between input images. Each image from the sensor has 800×600 pixel resolution. First, the image is cropped and the useful pixel value is extracted from the above GP and ray casting algorithm. A total of 253,213 useful pixel values are extracted from the single image and the ground truth image is reconstructed (right images of FIG. 4).

Modeling

Figure 5:
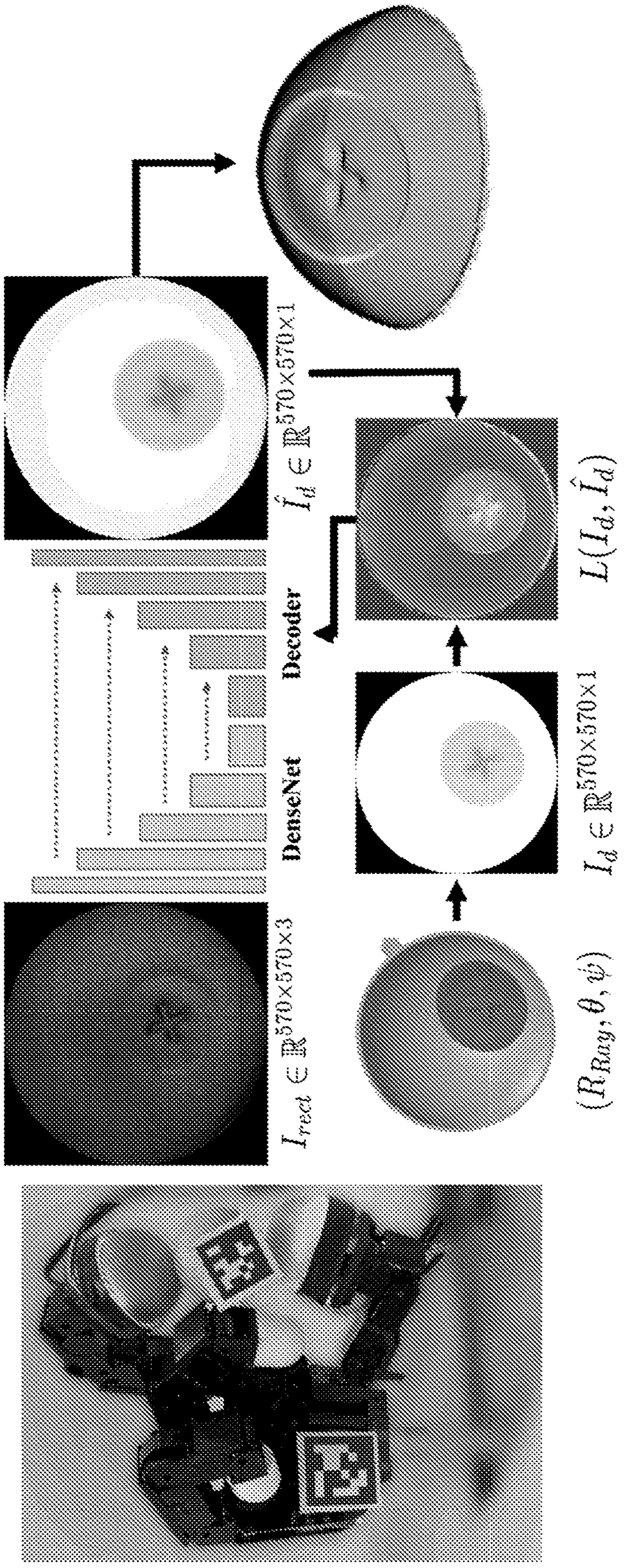
FIG. 5 shows according to an exemplary embodiment of the invention an algorithm. The sensor interior is the input to the autoencoder network. The ground truth is provided from the object CAD model and converted to a depth image. The resultant disparity between prediction and ground truth is used to train the network. The output depth image is converted to a 3D point-cloud via a correspondence step.

The goal of the model is to estimate the depth image from the RGB input image with the same dimension. This can be interpreted as the single image depth estimation problem, but unlike similar implementations, contextual semantic knowledge from the input image is unavailable in this case. Some of the leading network strategies are leveraging encoder-decoder structure with additional network block that utilizes global information from the depth image. Unlike general depth images from datasets, the dataset for the purposes of this invention requires more focus on the local deformation information since the global information is similar between datasets. A neural network with an autoencoder (encoder and decoder) structure is used to map an image of the interior of the sensor to the shape or force reconstruction output. The encoder part of the network consists of convolutional neural network (CNN) layers with skip connections to the decoder network. The decoder part concatenates the previous up-sampled block with the block of the same size from the encoder, which allows learning local information by skipping the network connection. The implemented loss is the combination of three losses: point-wise L1 loss on depth values, L1 loss on the gradient of the depth image, and structural similarity loss. FIG. 5 shows the overall working process of the sensor with network structure. The image size has been resized from 570×570×3 to 640×480×3 before it pass the network and resize the output result 320×240 to 570×570. Furthermore, the training quality is maximized by re-scaling the range (0, 255) depth value into range (10, 1000). The network is trained with 16 epochs (460K iterations) with batch size 4 from NVIDIA P100 16 GB GPU (brand and specification of Graphical Processing Unit used for network training)

Results

Figure 6:
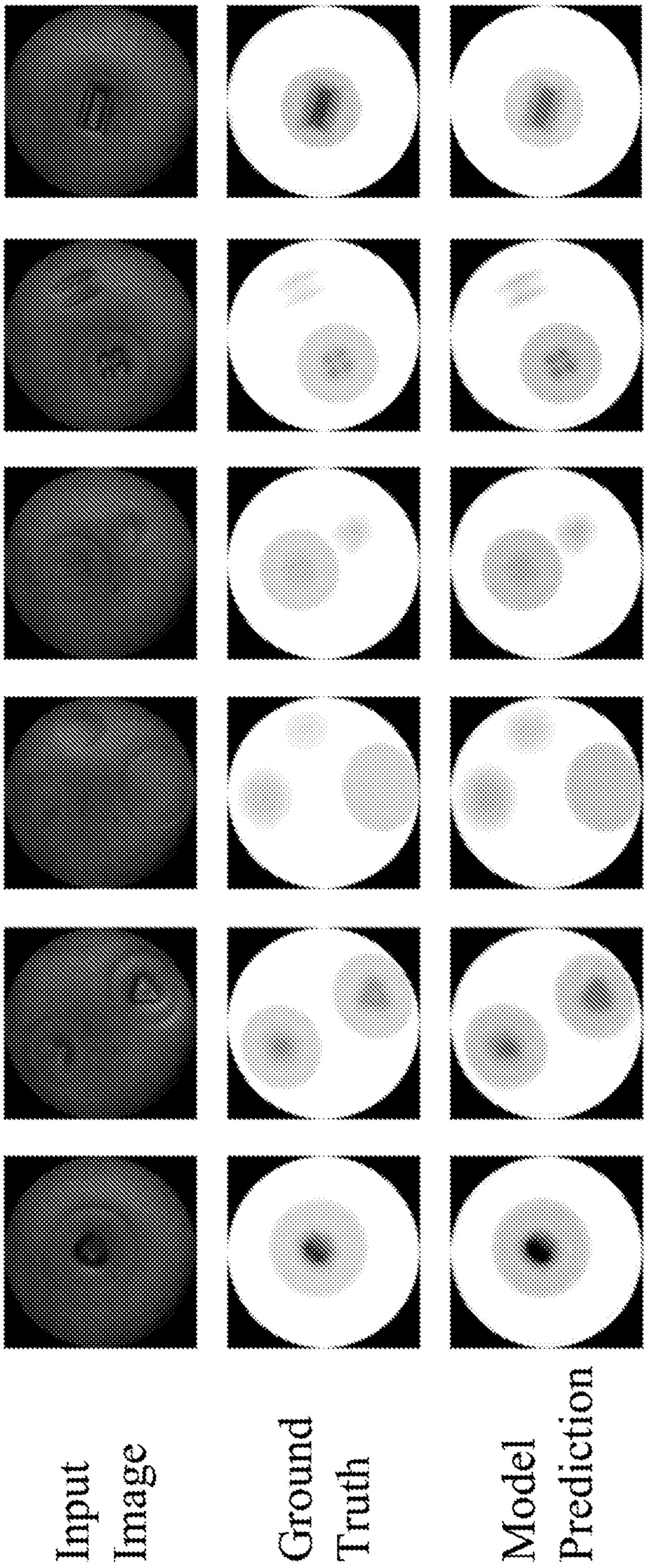
FIG. 6 shows according to an exemplary embodiment of the invention shape reconstruction performance.
Figure 7:
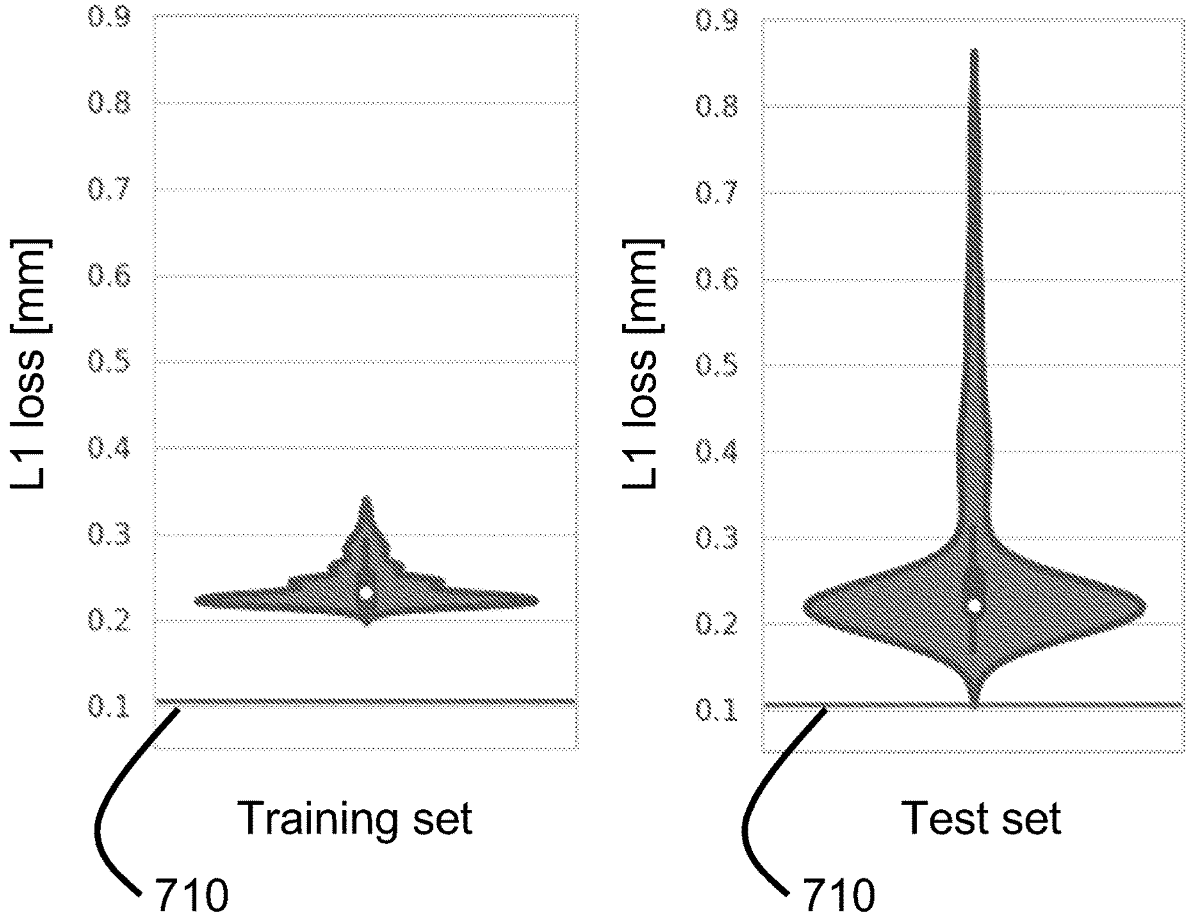
FIG. 7 shows according to an exemplary embodiment of the invention a re-projection error. Each data point represents the mean L1 re-projection error for a single image (effectively 253,213 pixels). Statistics are shown for the training (29,200 images) and test sets (1000 images).

FIG. 6 shows the qualitative result of shape reconstruction. The first row is the input image and the second row is the ground truth from the depth image. The model prediction is shown in the third row. Results show that the reconstruction works well with the given single monocular image. Note that input images come from the test set image, so the model did not train the input image. Furthermore, the sensor only takes 1.817 milliseconds on average to predict the depth view from single image. This implies that the sensor is able to perform real-time manipulation tasks with 30 fps. The point cloud is reconstructed based on the registered index with a predicted depth value. The right image in FIG. 5 and right-bottom images in FIG. 1 show the reconstructed sensor surface from depth image. After reconstruction, the point-wise L1 loss on the predicted depth image between the test set and training set are compared. FIG. 7 shows the violin plot of the reconstruction error statistics of all training and test sets. Note that the line 710 refers to the error of the ground truth, which is 109.6 micron from the precision error of the 3D printer. The model is justified by specifying the error of ground truth which matters while it goes to the 100-micron scale. The mean of L1 loss for training and test set is 0.2381 mm and 0.2811 mm, respectively. The mean of L2 loss for all training and test sets is 0.0306 mm and 0.03208 mm. In other words, the sensor in this example performs the shape reconstruction with an absolute mean error of 0.28 mm. The tactile sensor as an anthropomorphic hemispherical-shaped sensor is capable of reconstruction of the entire sensor surface. The sensor is shown to be durable, enduring more than 30,000 measurements without noticeable change. The sensor is calibrated with high-resolution contact, accounting for relative accuracy and uncertainty in the ground truth. A neural network is leveraged to model the depth map given the input image and showed that with this off-the-shelf encoder-decoder based network with the pre-trained model is capable of accurate depth reconstruction with a limited training dataset. The sensor was able to achieve an average of 0.28 mm depth difference on the test set.

Force Reconstruction

Figure 11:
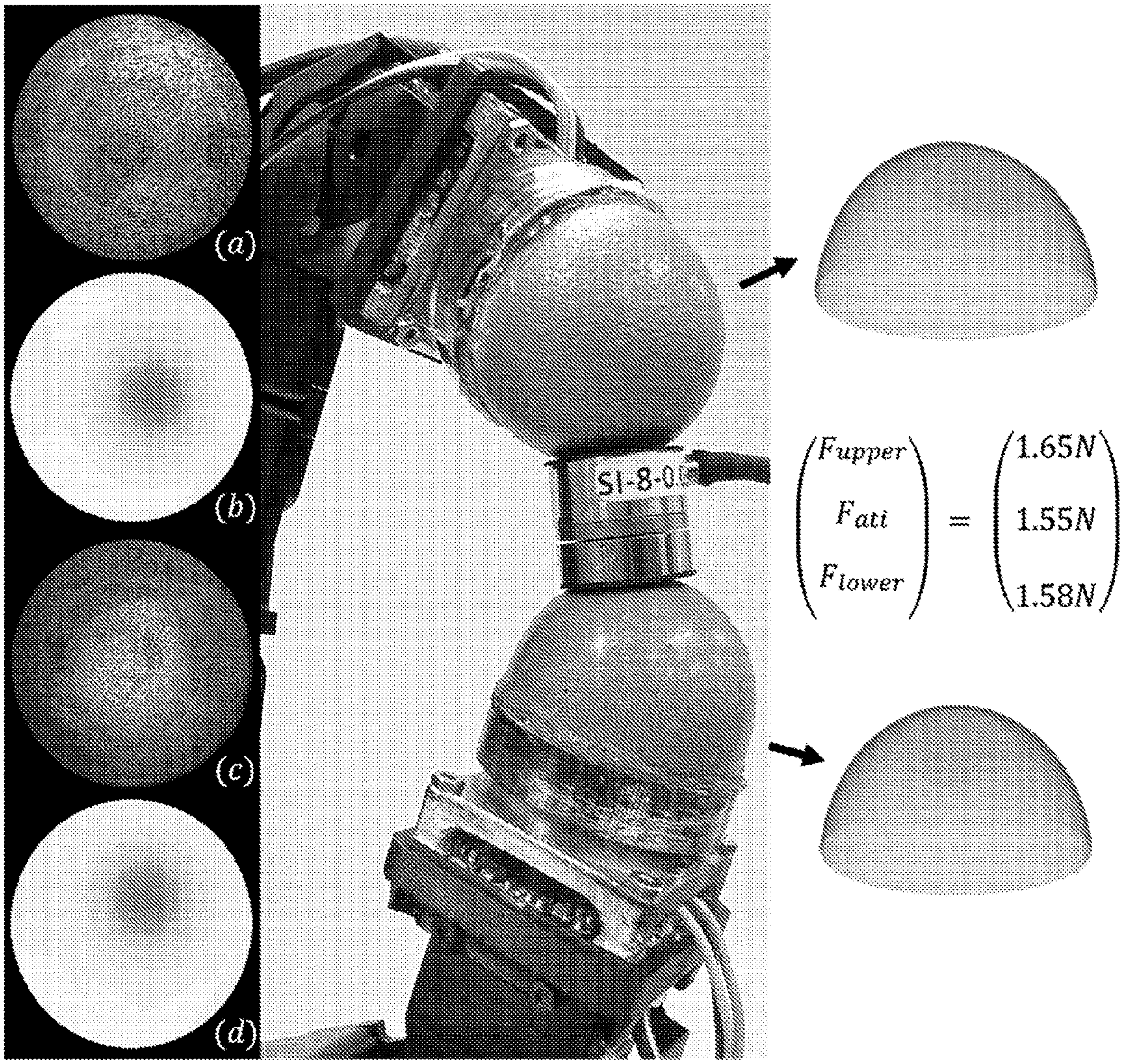
FIG. 11 shows according to an exemplary embodiment of the invention sensors are pinching ATI Nano sensor. Image (a) and (c) shows the image taken from upper and lower sensors. Image (b) and (d) shows the corresponding resultant depth images. Right pointcloud represents the 3D reconstructed surface of sensor. Right middle matrix shows the estimated force from sensors and ATI sensor.
Figure 12:
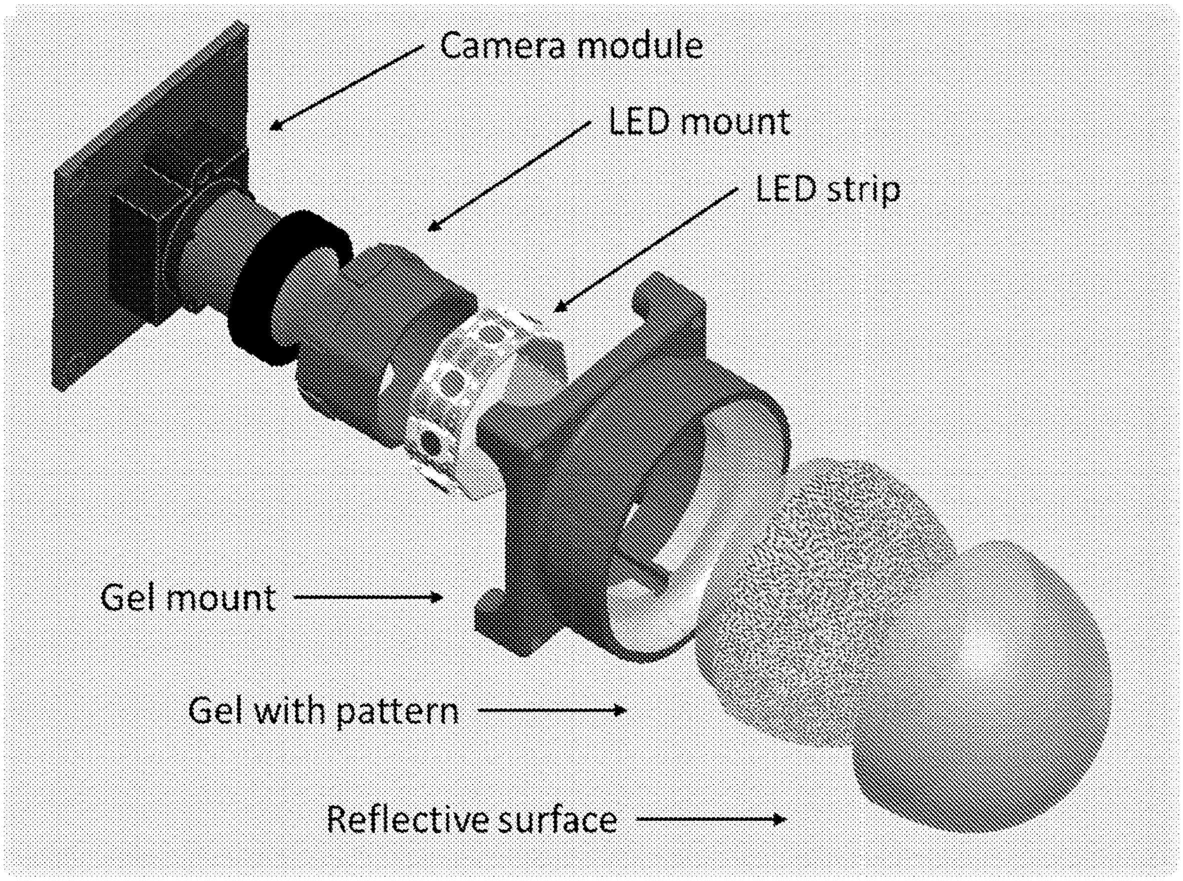
FIG. 12 shows according to an exemplary embodiment of the invention the optical tactile sensor in an exploded view.

One of the key aspects in the force reconstruction is patterning the contact surface with randomly generated, continuous patterns to enable to fully track surface forces and avoid aliasing. The objective in force reconstruction in this invention was to develop a soft, high-resolution robotic fingertip capable of providing full contact loads (normal ($F_N$), linear shear (Fs,x, Fs,y), torsional shear) at the points of contact as well as reconstructing the surface of deformation for shape sensing. In other words, embodiments of this invention for force reconstruction capture the full set of four independent forces at each point of contact. Components of this approach can be extended to robotic skin. A design of the optical tactile sensor is shown in FIG. 2 and FIG. 12, and the sensory output for a two-finger grasp is shown FIG. 1 and FIG. 11.

Markers and Force Measurement

Figure 8A:
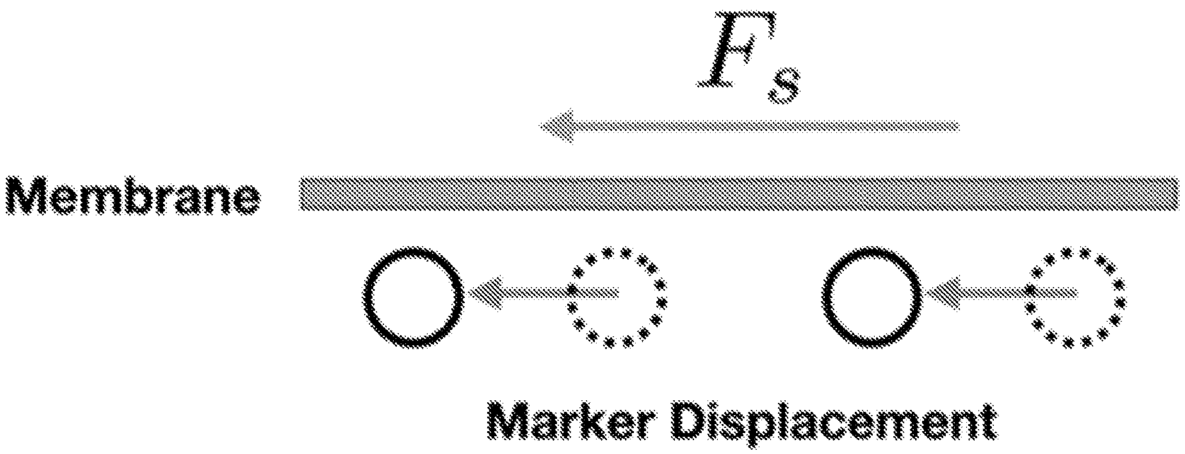
FIGS. 8A-C show according to an exemplary embodiment of the invention markers on the elastomeric hemisphere.

To measure forces, the design includes markers on the surface of the membrane. FIG. 8A illustrates the necessity of markers for measuring shear force, as the surface normal may be unperturbed in pure shear. A few considerations are a) what marker pattern will not occlude the ability to easily detect surface texture and light intensity/surface normal, and b) what choice of marker pattern allows for ease of tracking full contact forces at every point and is able to maintain computationally ecient pattern tracking while undergoing significant deformation.

Figure 8B:
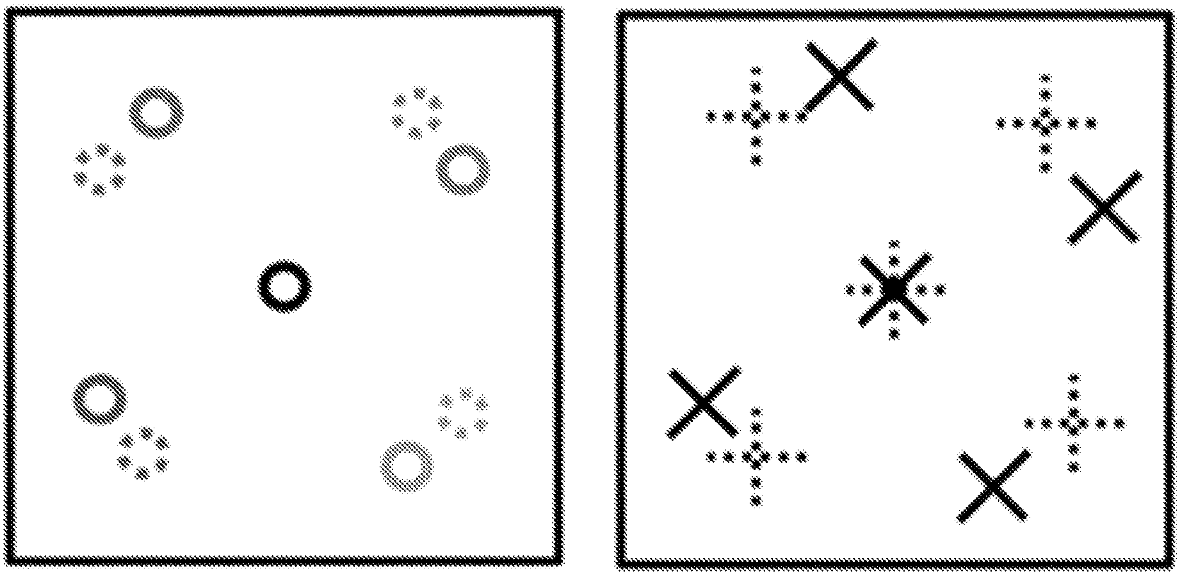
Figure 8C:
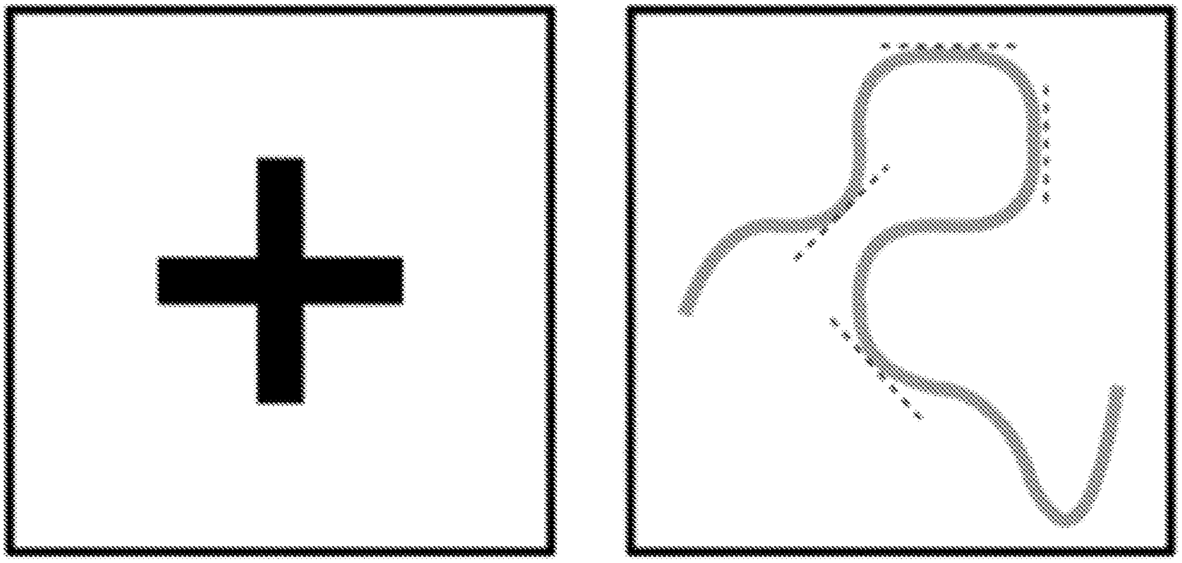

These considerations motivate marker pattern choice, where non-point markers can improve the ability to sense rotational shear at a point, as illustrated in FIG. 8B. Additionally, for the differential marker element, it can be illustrated that randomly generated, continuous patterns can undergo significant rotational deformation that can be tracked far more easily than simplistic, discrete pattern shapes: the cross pattern looks identical every 90 of rotation, which is much more difficult to track than a pattern where the tangents and deformation can indicate several revolutions, as shown in FIG. 8C. To illustrate this pattern, the inventors have successfully generated such unique patterns through the use of patterned hydrographic films coated on the silicone between the reflective coating and silicone layers. The inventors derived that using a randomly generated, continuous pattern as the marker choice allows one to accomplish tracking similar to state-of-the-art color-pattern adhesives that require significant computation to accommodate aliasing. Normal forces can be indicated by the pattern expansion/contraction, linear shear can be indicated by pattern shifting, and torsional shear through pattern rotation/translation. In this approach, methods in optical flow can be leveraged to track these changes, such as Dense Inverse Search (DIS).

Robotic Skin

The approaches above for obtaining texture, surface contact shape, and high-resolution surface contact forces immediately extend to an endoscopic camera closely observing the boundary of a flexible medium 'artificial skin'. The advantage of such a system is that this tactile sensing modality could be deployed at other locations (e.g. the interior of the robotic hand, the boundary of the robotic arm, the bottom of a robotic foot). To achieve this, micro-cameras can be used or equivalently, the use of fiber-optic image transmission can be achieved through a bundle of fiber-optic cables where each capable effectively serves as a pixel, and some fiber-cables could be dedicated to illuminating the contact surface, and the majority for transmitting the image to a camera located at a safer, distance location. This technology is available in medical applications for its robust use as an endoscope, and would be adapted for tactile sensing.

Fingertip Modeling and Characterization

While it has been widely recognized that optical-tactile sensors are capable of providing texture, contact geometry and contact-force observation, an unsolved problem is the high-resolution calibration of these sensors, particularly for contact forces. A common approach to calibration is to map the entire contact surface to a single force measurement using a single contact point sensor (single point, six-axis sensor). The primary justification is that considered cases only required a single force output from each finger, but this assertion quickly breaks down as smaller, more complex parts are manipulated (e.g. interior of a small electronic device with sub-components during manufacture assembly). Therefore, the importance of achieving characterization/calibration of contact geometry and forces is established, but the natural barrier is the lack of sensors that can calibrate a high-resolution optical-sensor because no higher resolution sensor exists at the moment.

Calibration

Figure 9A:
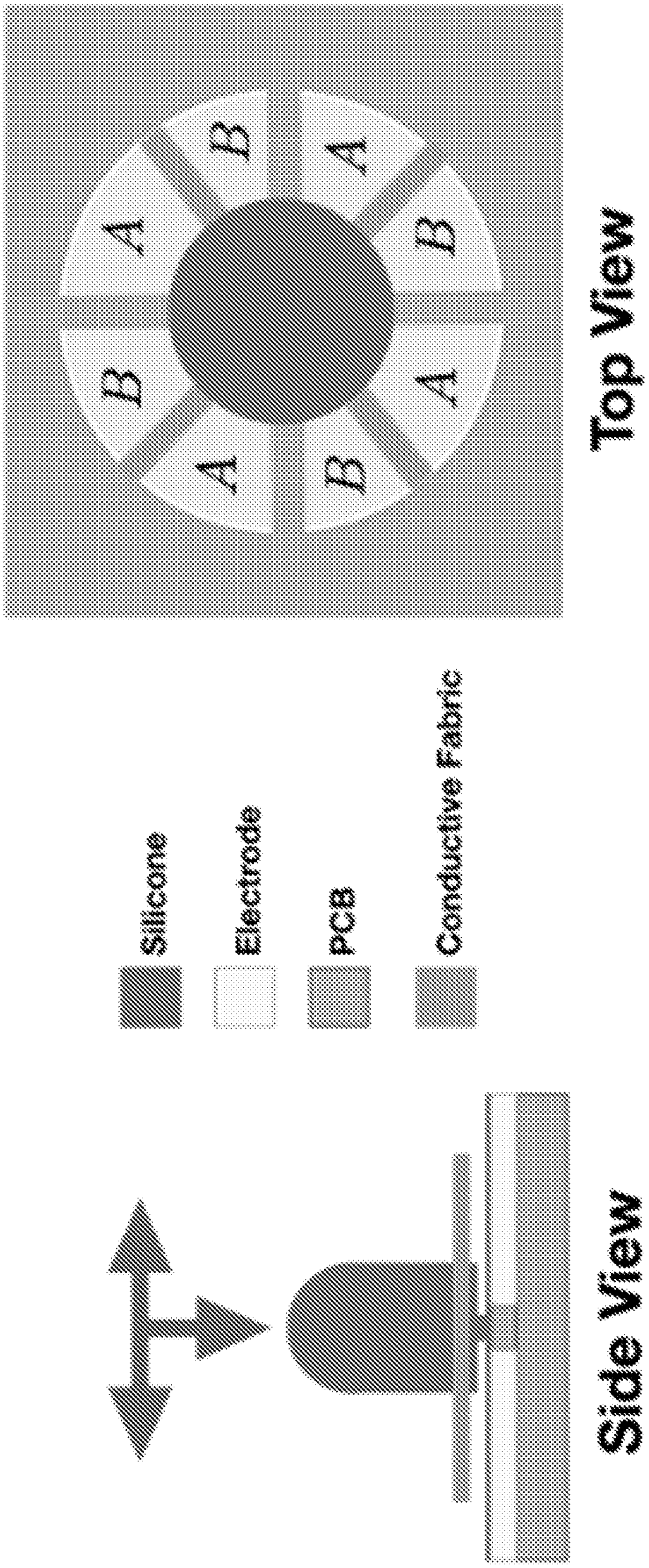
FIGS. 9A-D show according to an exemplary embodiment of the invention in FIG. 9A calibration of the sensor, in FIG. 9B a physics model characterization, in FIG. 9C a Gaussian Process (GP) up-sample model tuning, and in FIG. 9D a calibration with GP uncertainty informed up-sampling.
Figure 9B:
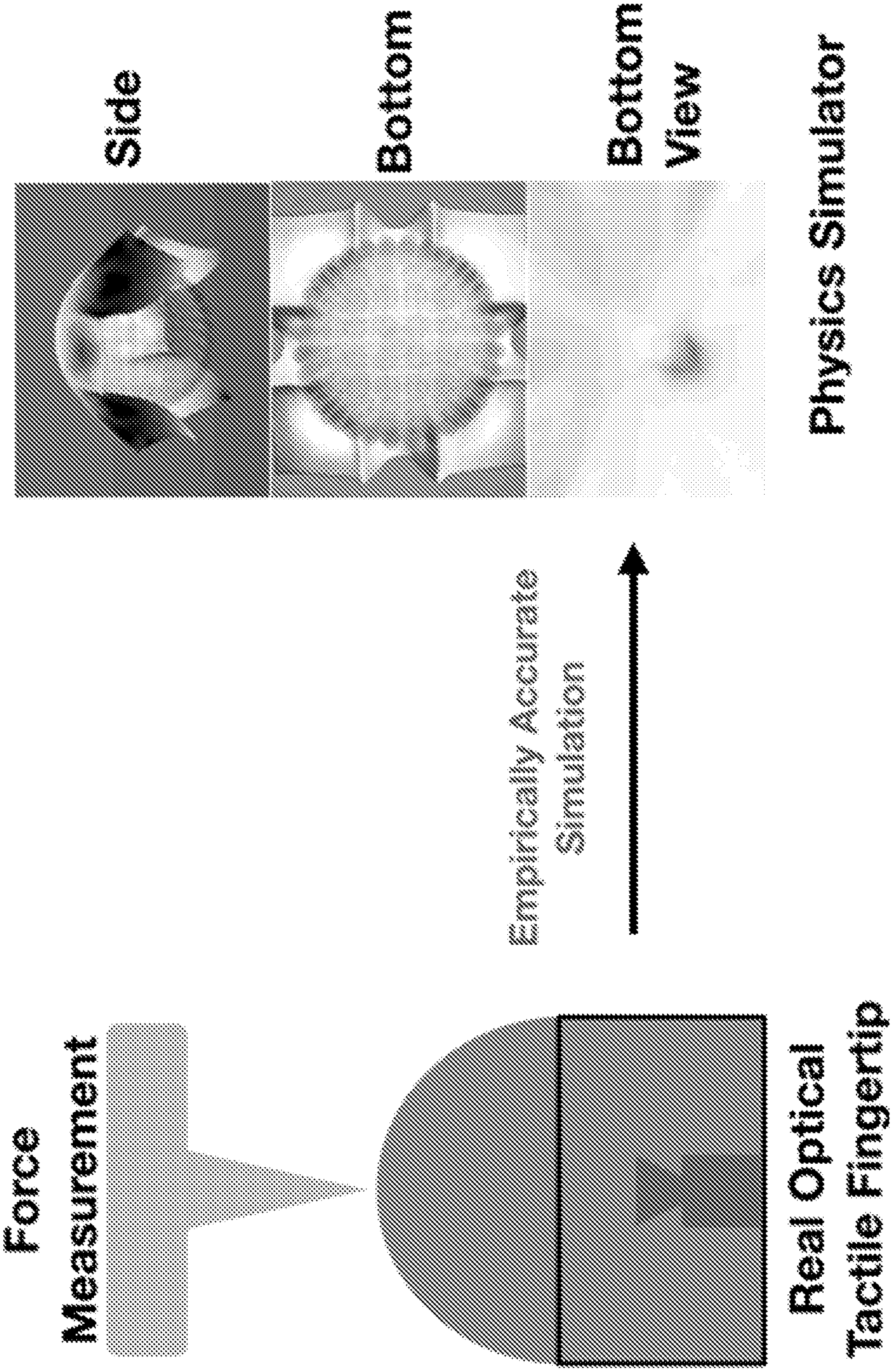
Figure 9C:
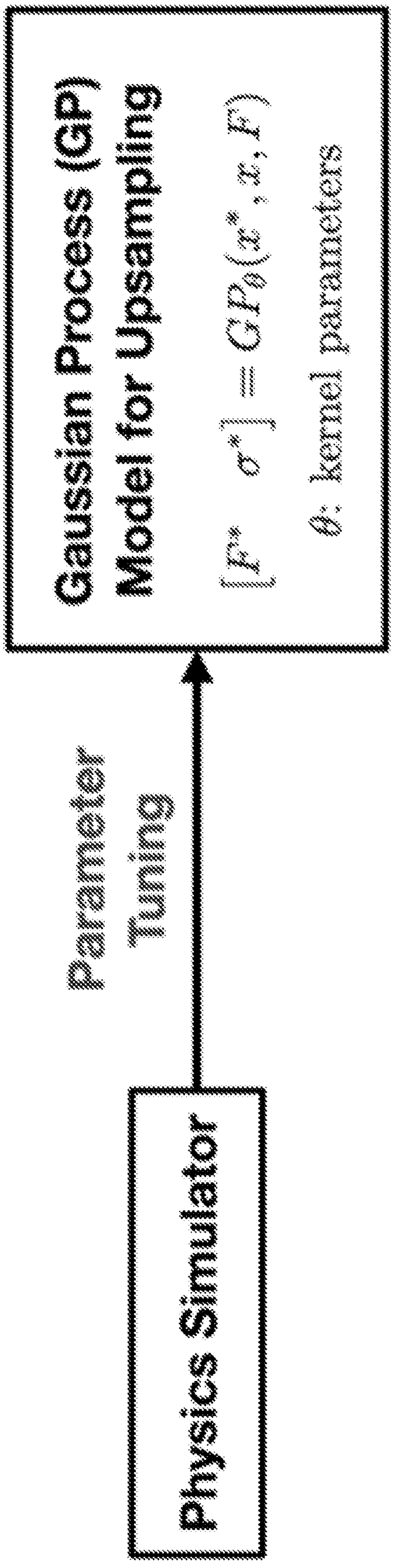

To calibrate the high-resolution shape sensing of the sensor, Time-of-Flight (ToF) sensors could be projected onto the surface and the deflection measured directly, however immediate challenges include the lower resolution limits of ToF sensors for how close they can be to provide measurements, and that external sensors will be occluded by objects causing deformation. These challenges have been overcome by 3D printing contact geometries and controlling their position when depressing them into the optical-tactile sensor. The typical resolution of the 3D printer provides approximately 0.2 mm of uncertainty (Ultimaker S5, 0.4 mm nozzle). By printing a series of 3D printed geometries utilizing a CNC machine for depression, contact geometries observed optically can be calibrated with a ground truth. For calibrating forces, this requires the four-step process illustrated in FIG. 9A-D. First, a transduction sensor array must be developed that provides the four contact forces at each point of measurement. This can be achieved with an extension of the work by Huh et al. (Dynamically Reconfigurable Tactile Sensor for Robotic Manipulation, IEEE Robotics and Automation Letters, vol. 5, pp. 2562-2569 April 2020) to include torsion, achieved through electrode augmentation and mixed conductive fabric as illustrated in FIG. 9A. Second, the material properties of the real optical-tactile sensor are empirically replicated in a physics-engine (such as MuJoCo), taking into account both material geometry and mechanical (elastic) properties (FIG. 9B). Third, the verified physics-engine can then be used to train a Gaussian Process (GP), whose inputs are a set of 'training' points (x) and correlated forces (F), along with 'test' points (x* with the goal of predicting the expected forces at the test points (F*) and the associated epistemic uncertainty ($\sigma$*) at every test point (FIG. 9C). The tuning of this model (6) is performed by adjusting the kernel parameters (denoted here in the vector $\theta$), which can be found through a dynamic, online search.

$$[F^{*}\ \sigma^{*}] = GP_{\theta}(x^{*}, x, F) \tag{6}$$

Figure 9D:
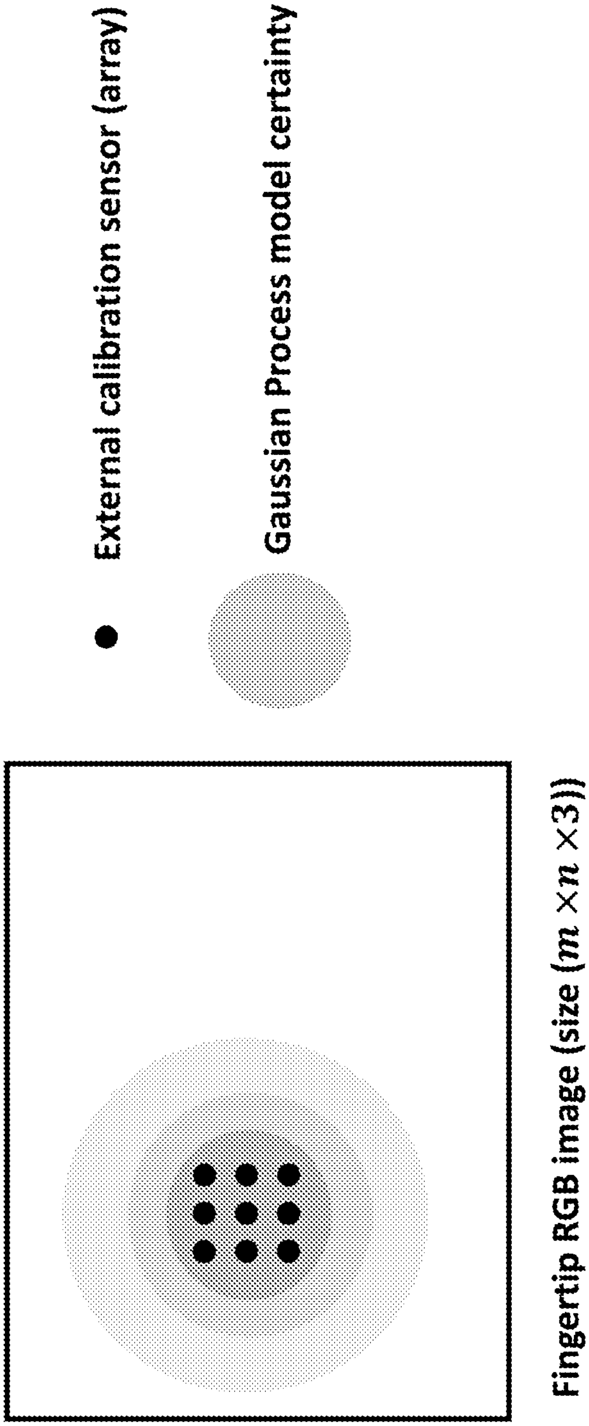
Figure 10A:
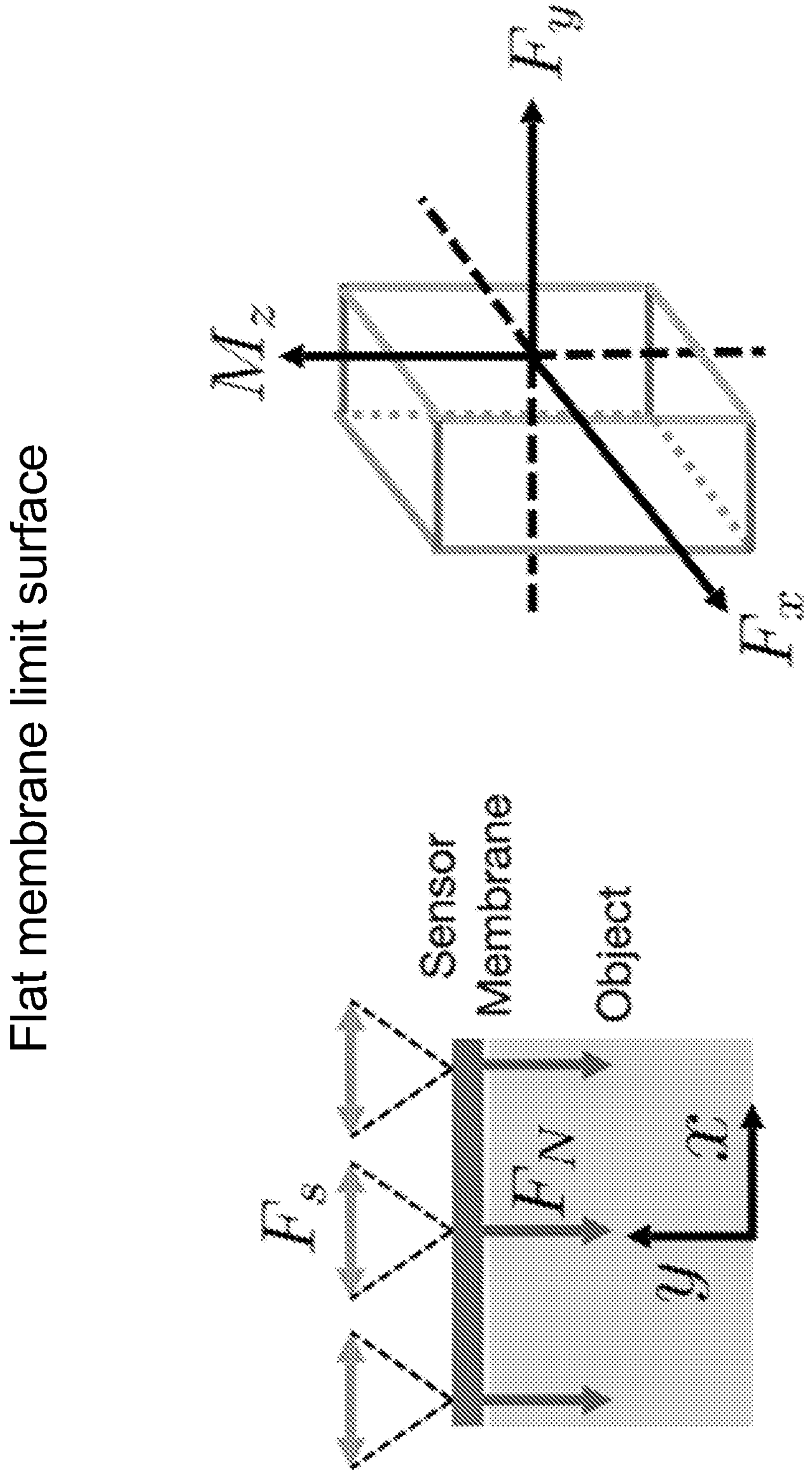
FIG. 10A-B show according to an exemplary embodiment of the invention a limit surface with in FIG. 10A illustrating the normal and linear shear forces resulting from a continuous membrane contacting an object along with the resulting limit surface in the wrench-space. The normal forces $F_N$ are capable of supplying both $F_y$ and ±Mz, and the shear forces Fs are capable of supplying $\pm F_x$ and $\pm M_z$, the resulting polytope is a rectangular volume in the $F_y$ half-space.
Figure 10B:
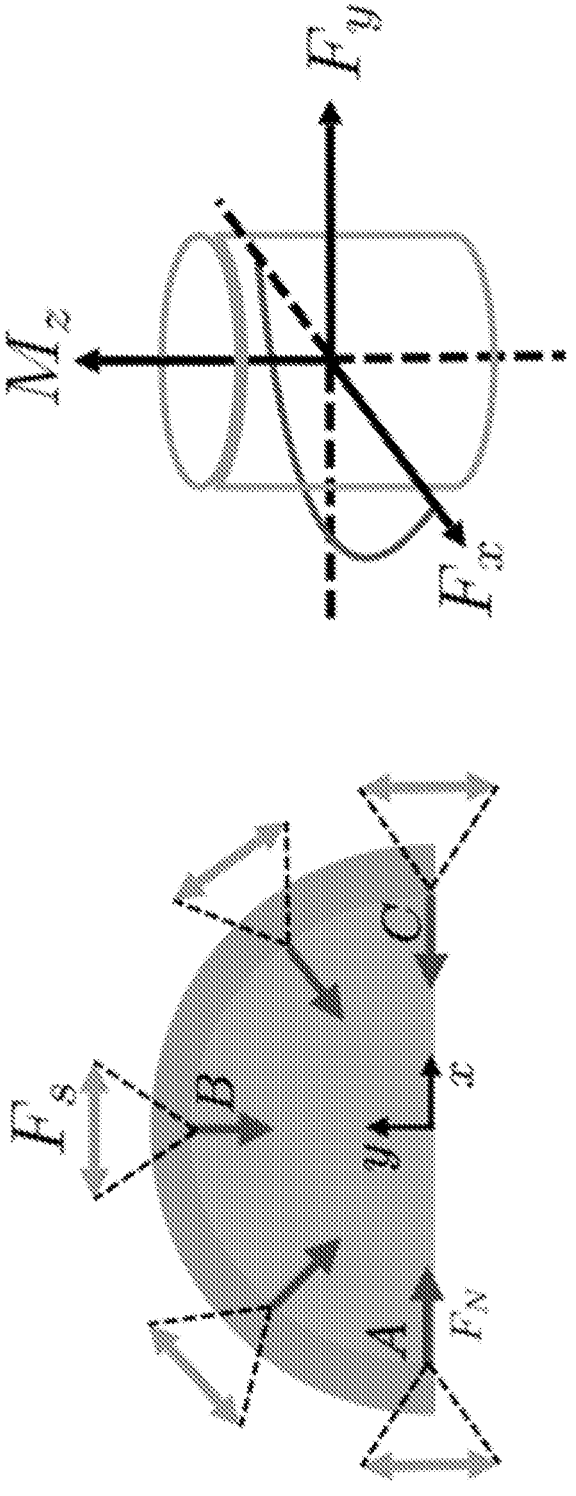

Finally, the resulting GP can be used in a meta-learning fashion to train the final model that maps images to contact forces. Given that the sensor RGB image has dimension $I_{m\times n\times 3}$, this can be achieved by inputting the position and contact forces from the updated external sensor (input dimension in $R^3$: $X_{p\times p\times 3}$, $F_{p\times p\times 4}$, where p<<(m, n)) in FIG. 9A into the GP model (6), along with the other observed positions as test points $X^{*}_{m\times n\times 3}$ in $R^3$. The output will be forces for the optical sensor $\tilde{F}_{m\times n\times 4}$, and can be used to tune a network which estimates the forces as $\hat{F}_{m\times n\times 4}$ as a model output. As shown in FIG. 9D, the GP will only be confident (certain) near the current external force depressions, and this uncertainty over all the test points is immediately available as $\sigma$* and can be used to attenuate the back-propagation error, by scaling it by the uncertainty using a Gaussian function.

Model

Once calibrated, the following model takes an optical-tactile fingertip image and returns a) texture classification b) 3D shape reconstruction of contact surface c) contact forces (normal $F_N$, linear shear ($F_{s,x}$, $F_{s,y}$), and torsional shear (Ts). For quick computing, neural network model(s) composed of Convolutional Neural Network (CNN) and Multi-Layer Perceptrons (MLP) are leveraged to capture the nonlinear, rich feature representations of the images for highly-accurate classification and regression. The selection of this combination used in variations for each output is not arbitrary and is now justified.

Model Justification

The CNN in its convolution asserts both a continuity assumption (pixels near each other are related) and smooths local effects, and it is crucial for image feature extraction. The MLP, one of the most fundamental networks, by the Universal Approximation Theorem is capable of approximating any bounded continuous function provided the MLP has a succinct number of parameters, and 'smaller' networks can work particularly well when approximating affine functions.

For texture classification, a CNN coupled with a MLP can perform image-based classification, making these a natural choice for high performance. For shape reconstruction, the surface is continuous and the analytical approach is to first recognize the affine relationship between light intensity and surface normal, Poisson integration and lookup tables, and networks can be leveraged to reconstruct the surface shape given surface normal estimation from light intensity, making the combination of CNN and MLP a natural first choice. For force estimation, one could start with the Finite Strain Theory assertion that the silicone membrane is an isotropic 'Cauchy Elastic Material' in that stress is determined solely by the state of deformation and not the path (time) taken to reach the current state. This assertion is the fundamental reason a Recurrent Neural Network (RNN), which is typically used for sequence prediction, may not be required for estimation. The principle of deformation for this elastic solid motivates the assertion of continuity between nearby points in the solid, and therefore those observed in the image, justifying the use of a CNN. Furthermore, the Cauchy constitutive equation relates point stresses on the unitary cube T (of which we will detect on the surface $\sigma=F_N$, $(\sigma_x, \sigma_y)=(F_{s,x}, F_{s,y})$, $\tau_{xy}=\tau_{yx}=\tau_s$) to the strain E (Green-Lagrange strain tensor) with the affine relationship $$T = GE \tag{7}$$

where G is the response function of the Cauchy elastic material and captures material properties and geometry. The affine relationship justifies the use of a sufficiently deep MLP to relate observed deformation and surface stresses.

Shape and Force Reconstruction

Design Criteria

A tactile sensor with a highly-deformable gel has a clear advantage for the vision-based approach. Gel deformation not only enables collecting the information of the contact object, but also easily tracks features, even with small indentation. To extract as much geometrical and force information from the single image, the sensor requires more attractive features. Furthermore, the in-hand manipulation is more prone to happen with a compact sensor size. To deal with these issues, the optical tactile sensor has the following features: 1) Reduced sensor size while maintaining highly-curved 3D shape. 2) Modular design from off-the-shelf materials for easy assembly and resource-efficiency. 3) Enriched features with randomized pattern on the surface for force estimation.

Gel Fabrication with Randomized Pattern

The fabrication process of the gel has three steps: 1. making a gel base, 2. printing a randomized pattern on the surface of the gel or defined in the elastomeric hemisphere, and 3. covering the gel with a reflective surface. For the pattern to be on the inner surface or outer surface of the elastomeric hemisphere. Technically speaking it is a few microns from the outer surface. So it could be defined as within the elastomeric hemisphere layer.

When the term gel with pattern is mentioned or discussed, the sensor hemisphere could be made out of silicone and once it has solidified (dried) then the pattern is put on the surface by stamping it. One could then add a very thin reflective spray so that light from inside will reflect back in, and light from outside cannot get in. These final layers are so thin that the pattern and reflective coating are essentially the same surface, but the pattern can only be seen from the inside.

Gel Base

The material of the gel is the same material (49.7 shore OO hardness), while the compact hemispherical shape has a 31.5 mm radius. For this example, the inventors increased the contact area between the gel mount and lens to be more durable—the contact area—volume ratio of one example is 0.0707 mm−1 (Area/Vol=3,264.3 mm2/46,173 mm3), and the ratio of another example is 0.1229 mm−1 (Area/Vol=1, 443.4 mm2/11,746 mm3).

Randomized Pattern on the Gel Surface

The randomized pattern can hold more information for extracting features from a single image, such as continuous deformation output or non-aliasing problem. Marker-based approaches seen in most tactile sensors are hard to deal with the aliasing problem with large deformation. An approach that would use a randomly colored pattern would enable intrinsic features to follow, but it is only applicable for sensors with planar surfaces, and the RGB channel can make interference with the pattern itself. Furthermore, the pattern of the surface of the sensor must be unique such that aliasing of the marker pattern is avoided under extreme deformation and maintains a balanced density between the pattern and background to extract the feature from the surface deformation.

To create the unique pattern, in one example, one would first distribute points on the 2D planar surface using voronoi stippling technique and randomly connect all points. Connecting the array of points can be considered as the Traveling Salesman Problem (TSP), a classic algorithm for finding the shortest route to connect a finite set of points with known positions. One would connect all points with a TSP solver, convert the solution as an image file, and extract the unique pattern using e.g. 8,192 points on a 25 mm×25 mm size square.

One could print a stamp plate of the randomized pattern using a laser cutter with a depth of 0.03 mm. Next, one would spread an ink on the plate, where the ink is composed of a silicone base with black ink (Smooth-on Psycho Paint and pigment, the ratio of silicone base to ink is 5:1). Then one would scrape the ink on the plate so that the ink only remains on the ridged part of the stamp. Next, one would press the cured gel onto the ink and distribute the pattern evenly by contacting all parts of the surface only once. The result of the printed pattern is shown in input images of FIG. 11.

Reflective Surface

The reflective surface could be made from a mixture of silicone paint and silver silicone pigment with the ratio of 2:1. A small quantity (0.5% of the solution) of Thivex thickening solution is added to the mixture. Then, the mixture is placed in a vacuum chamber to remove any air bubbles that may be present from mixing the materials together. The reflective surface was applied to the gel surface with an airbrush. However, this process lasted about two hours. Therefore, a new method was devised to dip the hemispherical gel into the paint solution. This results in thick layers of paint that block external light and approximately thirty minutes for application. To execute this method, a suction cup is used to grip the gel, which is then dipped into the silicone ink mixture. The gel is dipped in the ink a total of three times and a heat gun is used to cure the paint after each dip. With this method, users can easily recover from the abrasion created through gel usage by dipping the gel into the ink solution whenever necessary.

Sensor Fabrication

The bottom part of the sensor could contain a camera, LED mount, LED strip, and a gel mount covered with mirror-coating. The sensor's exploded view is shown in FIG. 12.

Illumination with Mirror-Coated Wall

The major requirement for a vision-based sensor is illumination. Because of the compact size of the sensor and the LED being a point light source with a limited angle of light emission, the LED strip with a single RGB channel LED had a limitation when the sensor became smaller. Therefore, one could implement a new illumination system with a mirror-coated wall while still maintaining the simple assembly feature.

Instead of using 3 LED lights or other tactile sensors, in the examples for this invention the inventors utilized 9 LED lights (3 LEDs for each color-red, green, and blue) from an LED strip (Adafruit Mini Skinny NeoPixel) while controlling the intensity of each LED. As shown in FIG. 12, the LED surrounds the camera while facing outside. An equivalent distance between each LED with more lights allows the sensor to get an equal distribution of lights. Furthermore, the increased brightness makes the sensor more resistant to external lights.

The 3D-printed gel mount reflects the lights to the gel through the mirror-coated surface. To develop the mirror-like effect on the side, one could flatten the surface of the gel mount with XTC-3D and coated it with the mirror-coating spray. Finally, the lights on the LED pass through the opposite side of the gel (see the input image in FIG. 11).

Sensor Assembly

The sensor was modularized into three parts-gel with gel mount and lens, LED module, and camera module. Each module is easily replaceable while the other modules remain intact. The gel, gel mount and lens are firmly attached through sil-poxy adhesive and Loctite Powergrab Crystal Clear adhesive. The gel module and led module is fixed through the 4 screws with camera module. The user can simply unscrew and replace either the camera, LED, or gel module. Since the sensor has more contact area-volume ratio, the durability increased even with the modularized design.

In one example, a camera module Sony IMX179 (30 fps) was chosen and M12 size lens with the field of view 185 deg degree for easy replacement. The final size of the sensor including the camera is W×D×H=32×32×43 mm with the weight 34 g. The cost of the sensor became cheaper because of the smaller LED strip ($3.75), gel part ($3), and camera mount ($1) with the same price of the camera system ($70).

Data Collection Process for Shape Reconstruction

The dataset for shape estimation could be collected in a similar manner as described infra but with more autonomy. While utilizing the CNC machine with a stepper motor for precise movement, an encoder for the stepper motor was implemented and a limit switch for an autonomous procedure. The sensor is attached to the stepper motor side with a mount. The mount ensures the center of the sensor is aligned with the rotational center of the stepper motor.

To collect more datasets in one process, 21 indenters, a Stl model which covers the entire sensor surface, are placed in a 3×7 grid on the plate of the CNC machine. Each row contains the same shape of indenters, each with a different orientation along a random axis. The rotation axis is aligned with the center of each indenter and placed in the xy plane. Therefore, each row shows different orientations by rotation on the x and y axes, while the z axis rotational difference is provided from the stepper motor. As a result, each data collection procedure generates up to 8,400 datasets (21 indenters×400 steps/rev) without human input.

Consideration of the bulging effect is a major improvement in the data collection process. Since the material of the gel, silicone, is a hyper-elastic material, the gel is incompressible. This causes the gel to bulge on the other side of the indented part. Therefore, the stl file was created with the bulging effect-cut some volume on the other side of the indented part. In this way, the sensor is exposed to a more natural deformation. The size of captured image from camera has been increased into (1024×768×3), which leads the final image size into (640×640×3). After collecting the input image, the depth is reprocessed from the corresponding Stl model through a Gaussian Process with a ray casting algorithm. The Stl files are available on 1github.

The minimum and maximum depth value of the entire dataset is 12.28 mm and 16.83 mm. Allowing for a margin around 0.05 mm, the depth value was normalized from 12.23 mm to 16.88 mm (4.64 mm range) into 0-255 pixel values. Finally, the 1 pixel increment corresponds to a 0.0182 mm increment in depth value. A dataset was collected for two sensors—the dataset for the sensor 1 has 38,909 training and 1,000 test configurations, and the sensor 2 has 20,792 training and 1,000 test configurations. Test configurations for each sensor are recorded with an unseen indenter from the training dataset. The datasets have a total 8.7 GB and 6.8 GB size for the sensor 1 and 2.

Dataset Collection for Force Estimation

The force dataset has been generated through randomly pushing sensors with the Franka panda arm. This method allows one to collect the dataset with no constraints on the pose of the franka arm. The right image in FIG. 13 shows the configuration of the force dataset collection. The sensor is mounted on the ATI Gamma sensor (SI-65-5) facing up.

10 different objects were created to push the sensor and collected the dataset while either attaching an object on each gripper finger or by gripping an object. The set of objects could include cylindrical shapes, spherical shapes and daily objects such as nuts. All joint positions including the position of the gripper fingers were recorded during dataset generation in the rate of 1,000 paths per second. The recorded path reduces human input for calibrating the other sensors.

During dataset collection, Peak signal-to-noise ratio (PSNR) was utilized as a filter on the image to exclude the duplicated datasets. The ring buffer collects the image up to 5 current images and applies the following thresh-old-PSNR ($Img_{curr}$, $Img_{prev,i}$)<0.9, where i=1, . . . , 5. The dataset has been collected within the range specified in the left part of the FIG. 13, where the unit of force and torque are N and N·m. the left image and force distribution in FIG. 13 shows the collected input image and corresponding force and torque data. The final dataset has been normalized between each force and torque range. The dataset has been collected for two sensors—the sensor 3 has 38,909 training force sets and 1,000 test sets, and the sensor 4 has 20,792 training sets and 1,000 test sets. Test sets are collected with different shape as the pushing objects used in each training sets. Total size of each dataset is 7.5 GB and 2.7 GB, respectively.

For high-resolution force reconstruction, the dataset is collected by pushing multiple single-point calibration force sensors into the surface of the optical tactile sensor at once and using the algorithmic method to perform material property informed interpolation with measures of uncertainty for calibrating the optical tactile sensor.

Algorithms for Shape Reconstruction

While the randomized pattern on the surface adds more features for continuously tracking surface movement, reconstructing the sensor surface requires learning features such as the deflected part's location, or surface normal based on the LED position. The position of the random pattern also gives the dynamic movement of the sensor, which requires the networks to learn more features from a single image. Therefore, two network models were compared to reconstruct the shape of the sensor surface.

1) Network with Swin Transformer and NeWCRF

The Vision Transformer (ViT) is a model from transformer-based architecture for image classification. While ViT splits an image into patches and train position embedding for each image patch, the Swin transformer builds the feature maps hierarchically with lower computational complexity because of a localized self-attention layer. The input image contains closely-related information relation between neighbor pixels. Therefore, the path embedding with hierarchical feature maps between each layer can better connect information between the indented and opposite parts.

Once the input image has been trained with Swin transformer as the encoder part, the decoder is also important for correlated embeddings. Models using a classification model to boost the performance of depth estimation, such as binsformer or adpative bins, perform well with the monocular depth estimation. However, Neural window FC-CRFs (NeWCRF) reaches the same performance by applying Conditional Random Field (CRF) on the decoder part to regress the depth map by utilizing fully-connected CRFs on each split image part (window). Therefore, the inventors for the purposes of the invention chose the Swin Transformer with NeWCRF decoder among the state-of-the art models for monocular depth estimation.

As shown in FIG. 14, the network gets input as 640×480×3. Without using the pretrained model, both the input and ground truth depth were normalized from 0 to 1. Four swin-transformer blocks on the encoder part were utilized using window size 20, the number of patches from one image. The predicted model is compared with the ground truth using the Scale-Invariant Logarithmic loss (SILog loss) with 0.85 as variance minimizing factor. The model is trained for 21 epochs with the batch size of 8 while the learning rate starts from 2×10−5 on the 4 Nvidia A4000 GPUs. The model took about 36 hours for training.

2) Optical Tactile Sensor Net Position

The above model is compared with the Network described infra without resizing the image. As shown in FIG. 14, the network has an encoder, and a decoder with skipped connections. The final result has been upsampled by the upsampling layer to get the 640×640×1 as an output depth image. Unlike the above model, the input and ground truth are un-normalized. The network is trained without any prior or pretrained model and used the reciprocal of the depth for structural similarity loss (target depth $y=256/y_{gt}$).

By comparing the above model with the model of this invention, one could prove 1) whether the random pattern blocks the estimation result and 2) how many model parameters are enough to estimate the depth or force estimation. The transfer learning model is developed based on the model with the better result. The training runs for 25 epochs with batch size 8. The learning rate is set to 1×10−4, where the model took about 16 hours for training.

Algorithm for Force Estimation

The network model for force estimation utilized each encoder part of the above two models. The network structure for force estimation is illustrated in FIG. 14. After passing either the Swin transformer encoder or the Densenet-based encoder, two fully-connected layers shrink the channel size from 1,000 to 500, and from 500 to 6, which corresponds to the 6 wrench inputs. The learning rate starts decreasing from 2×10−5. Both models are trained with batch size 8 for 22 epochs. The training has been done for each sensor dataset.

High Resolution Force Reconstruction

This is achieved through a two-step process, in the first step the sensor itself is rendered in an accurate simulation environment (one capable of deploying finite element analysis FEM), and a Gaussian Process (GP) (non-parametric machine learning model) is used to model forces/stresses at contact points made by an array of external virtual point sensors and interpolates with measures of uncertainty the forces at intermediate points (known by the software but undetectable at the points of contact from the virtual external point sensors array); the goal being to train the GP to accurately interpolate the forces on the sensor given the virtual point sensors. The outcome of this first step is the calibrated GP, which is then used in the second step with a real point-contact sensor array capable of providing the 4-axis force at every point of measurement as it touches the external boundary of our sensor. Again, the goal is to map the internal image from the sensor to the forces on the boundary (this being possible due to the mathematical affine nature between stresses (forces on the boundary) and strain (deflection/deformation) of the boundary). By leveraging the GP, an estimate of the applied force is available not only at the sparse array of point-contact sensors but through interpolation it is available at every point on the sensor. Additionally, an artifact of the GP is a measure of uncertainty along with every point of approximation. This uncertainty is directly leveraged by the model when training and is used as a confidence term used with updating the weights of the network (if points far away from point-contact array measurements may have more uncertain value, therefore error between the GP prediction of those points and the camera-based model should be weighted less than points of high-confidence near the point-contact array measurement). Then by touching the sensor in many locations with this calibration array of point-contact models, one can train the network to correctly estimate the 4-axis force everywhere on the boundary.

What is claimed is:

1. An optical tactile sensing method, comprising:

(a) having an optical tactile sensor, wherein the optical tactile sensor comprises:

(i) an elastomeric hemisphere with an outer contact surface, a reflective inner surface, and a base;

(ii) an array of LEDs circumferentially spaced at the base and capable of illuminating the reflective inner surface; and (iii) a single camera positioned at the base, wherein the single camera capable of capturing the illumination of the entire reflective inner surface of the elastomeric hemisphere in a single input image; and (b) performing shape reconstruction for a novel shape being in contact with the outer contact surface by inputting image pixels of a single sensor input image, obtained from the novel shape while in contact with the outer contact surface, to a trained neural network, wherein the trained neural network is outputting shape characteristics of the contact of the novel shape, wherein the trained neural network is a mapping of known 3D shapes, each in contact with and covering the entire outer contact surface at once, with corresponding image pixels of resulting single input images obtained from captured LED illumination of the reflective inner surface by the single camera while the known 3D shapes were in contact with and covering the entire outer contact surface.

2. The method as set forth in claim 1, wherein the elastomeric hemisphere further comprises a continuous pattern.

3. The method as set forth in claim 2, further comprising performing force estimation through tracking deformation of the continuous pattern of the elastomeric hemisphere while the novel shape being in contact with the outer contact surface, wherein the tracking is obtaining multiple sensor input images obtained during the deformation of the continuous pattern and inputting the image pixels of the multiple sensor input images to a trained neural network, wherein the trained neural network is outputting force vector information of the contact of the novel shape, wherein the trained neural network is a mapping of known applied force vector fields each in contact with the outer contact surface and causing known deformations of the continuous pattern of the elastomeric hemisphere, with corresponding image pixels of resulting multiple input images obtained from captured LED illumination of the reflective inner surface by the single camera while the known applied force vector fields and therewith known deformations were applied to the outer contact surface.

4. The method as set forth in claim 1, wherein the known 3D shapes represent different shape deformations of the outer contact surface.

5. The method as set forth in claim 4, wherein the different shape deformations comprise one or more indenters.

6. The method as set forth in claim 4, wherein the different shape deformations comprise one or more shape indicators.

7. The method as set forth in claim 1, wherein the single camera is a Fisheye lens camera.

8. The method as set forth in claim 2, wherein the continuous pattern is defined as a pattern of connected lines that join evenly spaced dots without the lines ever crossing and such that for a small area, segments of the line point in all primary directions on a surface of the elastomeric hemisphere a surface of the elastomeric hemisphere.

9. The method as set forth in claim 3, wherein the force vector field is defined as a 4D force vector with forces in X, Y, Z direction and torsion.

* * * * *